US010298985B2

United States Patent
Kalagi et al.

(10) Patent No.: US 10,298,985 B2
(45) Date of Patent: May 21, 2019

(54) SYSTEMS AND METHODS FOR PERFORMING QUALITY BASED STREAMING

(71) Applicant: MediaMelon, Inc., San Francisco, CA (US)

(72) Inventors: Ameet Kalagi, Bangalore (IN); Rupesh Kumar Satija, Patiala (IN); Ali C. Begen, Meram (TR)

(73) Assignee: MEDIAMELON, INC., San Francisco, CA (US)

(*) Notice: Subject to any disclaimer, the term of this patent is extended or adjusted under 35 U.S.C. 154(b) by 220 days.

(21) Appl. No.: 15/152,511

(22) Filed: May 11, 2016

(65) Prior Publication Data
US 2016/0337680 A1  Nov. 17, 2016

Related U.S. Application Data

(60) Provisional application No. 62/295,514, filed on Feb. 16, 2016, provisional application No. 62/295,515, filed on Feb. 16, 2016.

(30) Foreign Application Priority Data

May 11, 2015 (IN) .......................... 2402/CHE/2015
May 11, 2015 (IN) .......................... 2403/CHE/2015
(Continued)

(51) Int. Cl.
*G06F 15/16* (2006.01)
*H04N 21/2662* (2011.01)
(Continued)

(52) U.S. Cl.
CPC ......... *H04N 21/2662* (2013.01); *H04L 47/38* (2013.01); *H04L 65/602* (2013.01);
(Continued)

(58) Field of Classification Search
CPC ......... H04N 21/8456; H04N 21/23439; H04N 21/2402; H04N 21/26258; H04N 21/6125;
(Continued)

(56) References Cited

U.S. PATENT DOCUMENTS 7,447,791 B2   11/2008  Leaning et al.
7,760,801 B2   7/2010   Ghanbari et al.
(Continued)

FOREIGN PATENT DOCUMENTS

EP       1338131 B1        8/2009
WO       2007066066 A2     6/2007
(Continued)

OTHER PUBLICATIONS

Opticom.com web page, printed Jul. 14, 2017, 1 pg.
(Continued)

*Primary Examiner* — Dustin Nguyen
*Assistant Examiner* — Hao H Nguyen
(74) *Attorney, Agent, or Firm* — KPPB LLP

(57) ABSTRACT

Systems and methods in accordance with various embodiments of the invention enable quality based streaming. A content player in accordance with an embodiment of the invention includes: a processor; a network interface; and memory containing a content player application. The content player application can direct the processor to: receive quality metadata describing a plurality of streams, where: the plurality of streams are encoded at different maximum bitrates; each stream is divided into content segments; and the quality varies between content segments in each stream. Furthermore, the content player application directs the processor to measure available bandwidth; request content segments from the plurality of streams based upon the available network bandwidth and the quality metadata,
(Continued)

where the requested content segments include content segments encoded at a maximum bitrate and having quality that is the lowest maximum bitrate that achieves a target quality level.

19 Claims, 18 Drawing Sheets

(30) Foreign Application Priority Data

| | | |
|---|---|---|
| May 11, 2015 | (IN) | 2406/CHE/2015 |
| Feb. 16, 2016 | (IN) | 201641005337 |

(51) Int. Cl.

| | |
|---|---|
| *H04L 29/06* | (2006.01) |
| *H04L 12/811* | (2013.01) |
| *H04N 21/61* | (2011.01) |
| *H04N 21/845* | (2011.01) |
| *H04N 21/24* | (2011.01) |
| *H04N 21/44* | (2011.01) |
| *H04N 21/858* | (2011.01) |
| *H04N 21/2343* | (2011.01) |
| *H04N 21/442* | (2011.01) |
| *H04N 21/84* | (2011.01) |

(52) U.S. Cl.
CPC .......... *H04L 65/607* (2013.01); *H04L 65/608* (2013.01); *H04L 65/80* (2013.01); *H04N 21/23439* (2013.01); *H04N 21/2402* (2013.01); *H04N 21/44004* (2013.01); *H04N 21/44209* (2013.01); *H04N 21/6125* (2013.01); *H04N 21/84* (2013.01); *H04N 21/8456* (2013.01); *H04N 21/8586* (2013.01)

(58) Field of Classification Search
CPC ......... H04N 21/2662; H04N 21/44004; H04N 21/44209; H04N 21/8586; H04N 19/146; H04N 19/169; H04N 19/46; H04N 21/2401
USPC ............ 709/217, 230, 231; 375/240, 240.01, 375/240.12
See application file for complete search history.

(56) References Cited

U.S. PATENT DOCUMENTS

| | | | |
|---|---|---|---|
| 7,761,901 | B2 | 7/2010 | Walker et al. |
| 7,912,974 | B2 | 3/2011 | Alvarez Arevalo et al. |
| 8,064,470 | B2 | 11/2011 | Turnbull et al. |
| 8,125,901 | B2 | 2/2012 | Mulroy et al. |
| 8,924,580 | B2 | 12/2014 | Oran et al. |
| 2006/0045180 | A1 | 3/2006 | Ghanbari et al. |
| 2013/0042015 | A1* | 2/2013 | Begen ................. B63B 15/0083 709/231 |
| 2013/0089142 | A1* | 4/2013 | Begen .............. H04N 21/23424 375/240.12 |
| 2013/0290492 | A1* | 10/2013 | ElArabawy ............. H04L 65/80 709/219 |
| 2014/0019593 | A1* | 1/2014 | Reznik .................... H04L 65/60 709/219 |
| 2014/0201382 | A1* | 7/2014 | Shivadas ............... H04L 65/605 709/231 |
| 2014/0280781 | A1* | 9/2014 | Gregotski ............... H04L 65/60 709/219 |
| 2015/0100703 | A1 | 4/2015 | Oran et al. |
| 2015/0180924 | A1* | 6/2015 | O'Callaghan ......... H04L 65/605 709/219 |
| 2016/0134677 | A1* | 5/2016 | Mueller ................ H04L 65/602 709/219 |
| 2016/0381113 | A1* | 12/2016 | Phillips ................. H04L 65/601 709/219 |

FOREIGN PATENT DOCUMENTS

| | | |
|---|---|---|
| WO | 2007066066 A3 | 8/2007 |
| WO | 2008081185 A2 | 7/2008 |
| WO | 2008081185 A3 | 10/2008 |
| WO | 2009060178 A1 | 5/2009 |
| WO | 2009112801 A1 | 9/2009 |
| WO | 2010067050 A1 | 6/2010 |
| WO | 2010092323 A2 | 8/2010 |
| WO | 2010092324 A2 | 8/2010 |
| WO | 2010092327 A2 | 8/2010 |
| WO | 2010100427 A1 | 9/2010 |
| WO | 2010092323 A3 | 12/2010 |
| WO | 2010092324 A3 | 12/2010 |
| WO | 2010092327 A3 | 12/2010 |
| WO | 2012001339 A1 | 1/2012 |
| WO | 2012042230 A1 | 4/2012 |
| WO | 2012085504 A1 | 6/2012 |
| WO | 2012085505 A1 | 6/2012 |
| WO | 2012089991 A1 | 7/2012 |
| WO | 2012110764 A1 | 8/2012 |

OTHER PUBLICATIONS

SSIMWAVE web page—About Us, printed Jul. 14, 2017, 2 pgs.
Begen, Ali C. "Quality-Aware HTTP Adaptive Streaming", ACM Multimedia Systems (MMSys) Conference 2014, Nov. 3, 2014, Singapore, 8 pgs.
Li, Zhi et al., "Streaming Video over HTTP with Consistent Quality", Multimedia Systems 2014 Proceedings of the 5th ACM Multimedia Systems Conference, Mar. 19, 2014, pp. 248-258.

* cited by examiner

FIG. 8

Segment Quality Values

| | SEGMENT 1 | SEGMENT 2 | SEGMENT 3 | SEGMENT 4 | SEGMENT 5 | SEGMENT 6 |
|---|---|---|---|---|---|---|
| BITRATE A | 5 | 3 | 4 | 7 | 5 | 6 |
| BITRATE B | 4 | 2 | 3 | 6 | 4 | 5 |
| BITRATE C | 4 | 2 | 3 | 3 | 4 | 2 |
| BITRATE D | 3 | 1 | 2 | 3 | 1 | 2 |

Target Quality

- BITRATE A: 5
- BITRATE B: 4
- BITRATE C: 3
- BITRATE D: 2

Mapped Bitrates Per Segment

| | SEGMENT 1 | SEGMENT 2 | SEGMENT 3 | SEGMENT 4 | SEGMENT 5 | SEGMENT 6 |
|---|---|---|---|---|---|---|
| BITRATE A | A | A | A | B | A | B |
| BITRATE B | C | A | A | B | C | B |
| BITRATE C | D | A | C | D | C | B |
| BITRATE D | D | C | D | D | C | D |

SYSTEMS AND METHODS FOR PERFORMING QUALITY BASED STREAMING

CROSS-REFERENCE TO RELATED APPLICATIONS

This application claims priority under 35 U.S.C. § 119(e) to U.S. Provisional Application Ser. No. 62/295,514, entitled "Achieving a Trade-Off Between Maximizing Quality and Saving Bits in Adaptive Streaming" to Kalagi, filed Feb. 16, 2016, and to U.S. Provisional Application Ser. No. 62/295,515, entitled "Constant Quality Video Streaming" to Kalagi, filed Feb. 16, 2016. This application also claims priority under 35 U.S.C. § 119(a) to Indian Provisional Application Serial No. 2403/CHE/2015, entitled "Enabling Constant Quality Streaming From a Constant Bitrate Content Encoded at Multiple Rates" to Kalagi, filed May 11, 2015 in India, and claims priority to Indian Provisional Application Serial No. 2402/CHE/2015, entitled "Achieving a Trade-off Between Maximizing Quality and Saving Bits in Adaptive Streaming" to Kalagi, filed May 11, 2015 in India, and claims priority to Indian Provisional Application Serial No. 2406/CHE/2015, entitled "Constant Quality Video Streaming", to Kalagi, filed May 11, 2015 in India and claims priority to Indian Provisional Application Serial No. 201641005337, entitled "System and Method to Optimize the Quality and Bandwidth in Adaptive Bitrate Streaming" to Kalagi, filed Feb. 16, 2016 in India. The disclosures of Application Ser. No. 62/295,514, 62/295,515, 2403/CHE/2015, 2402/CHE/2015, 2406/CHE/2015 and 201641005337 are hereby incorporated by reference in their entirety.

FIELD OF THE INVENTION

The present invention generally relates to adaptive bitrate (ABR) streaming, and more particularly to optimization of quality and bandwidth in adaptive bitrate streaming.

BACKGROUND

The term streaming media describes the playback of media on a playback device, where the media is stored on a server and is sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth and CPU capacity) in real time and adjusting the bitrate of the streamed media accordingly. Typically, the source media is encoded at multiple bit rates and the playback device or client switches between streaming the different encodings depending on available resources.

Existing Hypertext Transfer Protocol (HTTP) based adaptive bitrate streaming systems may employ protocols such as MPEG Dynamic-Adaptive-Streaming-over-HTTP (MPEG DASH) and HTTP Live Streaming (HLS) and employ video encoders to compress the video at one or more bitrates to generate multiple streams in accordance with HTTP adaptive streaming principles. The client media players may choose one of these bitrates based on the bandwidth available at the client to improve the playback performance compared to progressive streaming systems, which stream content encoded at single maximum bitrate and cannot switch to streams encoded at lower or higher maximum bitrates in response to changes in available network bandwidth.

Streams of content utilized in adaptive bitrate streaming systems are typically encoded at target bitrates. These streams are typically one of the bitrates in ABR encoded video. Target bitrates include an anticipated maximum bitrate that a user may obtain while streaming content. Streams are typically encoded in a non-uniform manner, but contain an average bitrate. Streams are also usually encoded where the stream has an average bitrate that approaches the maximum bitrate. These maximum bitrates therefore, are generally used to make stream switching decisions.

The video encoders are typically configured to generate constant bitrate (CBR) streams. In CBR encoding, also referred to as capped-VBR in literature, the bitrate measured over a specific duration, such as 1 second, is not allowed to exceed a certain threshold above the maximum bitrate while the bitrate can go below the maximum bitrate by any amount. In such CBR schemes, the quality of a video content may depend on the complexity of scenes in the video content and can vary at a given constant bitrate. For example, scenes with low complexity may show good quality while a highly complex scene may have relatively low quality.

Streams utilized in adaptive bitrate streaming are typically segmented, which may include splitting the streams into short duration segments of equal duration in each of the alternative streams. The segments can be packaged in container files formatted in accordance with the requirements of the standards such as MPEG DASH or HLS. These segments can then be published to a HTTP server for distribution.

SUMMARY OF THE INVENTION

Systems and methods in accordance with various embodiments of the invention enable quality based streaming. One embodiment of the method of the invention includes receiving content including a plurality of streams, where: the plurality of streams are encoded at different maximum bitrates; each stream is divided into content segments; and the quality varies between content segments in each stream based upon the content encoded by the content segment. In addition, the method includes: measuring the quality of the content segments; mapping content segments to output streams having target quality levels by comparing the measurement of the quality of the content segments to the target quality levels of the output streams, where at least one mapping to an output stream having a specific target quality level is based upon a content segment being encoded with the lowest maximum bitrate that achieves the specific target quality level; and generating a set of output streams where each output streams includes content segments encoded at different maximum bitrates.

In a further embodiment, the plurality of streams in the received content are generated from source content by multiple encoders that each encode one of the plurality of streams encoded by multiple encoders.

In another embodiment, the source content is received and encoded in real time using single-pass encoding.

In a still further embodiment, the plurality of streams are encoded at different resolutions.

In still another embodiment, the set of output streams includes at least one output stream that includes content segments encoded at different resolutions.

In a yet further embodiment, measuring the quality of the content segments includes measuring the quality of streams from the plurality of streams having different resolutions.

In yet another embodiment, measuring the quality of the content segments at different resolutions includes using at least one measurement process selected from the group consisting of: comparing the number of encoded bits per pixel, measuring the mean squared error between a low resolution frame of video scaled to meet a higher resolution frame of video, and analyzing the contrast value of one or more frames in a video.

In a further embodiment again, the plurality of streams are described in a manifest file that includes tags identifying resolution discontinuities within a stream.

In another embodiment again, measuring the quality of the content segments includes using at least one measurement process selected from the group consisting of: structural similarity; peak signal to noise ratio; and mean opinion score.

In a further additional embodiment, measuring the quality of the content segments includes decoding the content segments and measuring the quality of the decoded content segments.

In another additional embodiment, measuring the quality of content segments in a plurality of streams includes: decoding content segments from a first stream to measure a first set of quality parameters for the first stream, where the first set of parameters includes a second subset of parameters; partially decoding at least a second stream to measure the second subset of parameters for the second stream; determining the quality of the first stream using the first set of parameters; and determining the quality of the second stream using parameters from the first set of parameters of the first stream and the second subset of parameters for the second stream.

In a still yet further embodiment, the first set of parameters includes contrast and the second set of parameters includes at least one parameter selected from the group consisting of: average quantization parameter (QP), maximum QP, and minimum QP.

In still yet another embodiment, measuring the quality of a content segment includes determining the quality of the content segment based upon measurements of the quality of a plurality of frames within the content segment.

In a still further embodiment again, determining the quality of the content segment based upon measurements of the quality of a plurality of frames within the content segment includes taking a weighted average of the measured qualities of the plurality of frames from the content segment in which lower quality scores have higher weights.

In still another embodiment again, determining the quality of the content segment based upon measurements of the quality of a plurality of frames within the content segment includes selecting the quality of the frame from the plurality of frames having the lowest measured quality as the quality of the content segment.

In a still further additional embodiment, determining the quality of the content segment based upon measurements of the quality of a plurality of frames within the content segment includes selecting the average quality of the plurality of frames as the quality of the content segment.

In still another additional embodiment, content segments within a stream can vary in duration; and measuring quality of a content segment includes modifying the quality score based upon the duration of a content segment.

In a yet further embodiment again, the target quality level is generated based on the quality levels of previously mapped content segments.

In yet another again, the target quality level is a range of specific values.

In a yet further additional embodiment, generating a set of output streams further includes generating a quality based streaming manifest that describes the set of output streams.

In yet another additional embodiment, mapping content segments to output streams having target quality levels includes selecting content segments encoded at a higher maximum bitrate than a target minimum available network bandwidth.

In a further additional embodiment again, the method includes: receiving playback condition data; generating an aggressiveness factor based on the playback condition data. In addition, mapping content segments to output streams includes selecting content segments based at least in part upon the aggressiveness factor.

A still additional embodiment includes: a processor; at least one input; a memory connected to the processor, where the memory contains: a quality information generation application; and a packaging application. In addition, the quality information generation application directs the processor to: receive content including a plurality of streams, where: the plurality of streams are encoded at different maximum bitrates; each stream is divided into content segments; and the quality varies between content segments in each stream based upon the content encoded by the content segment. Furthermore, the quality information generation application also directs the processor to analyze the content segments of the stream for quality; and generate a quality factor for the content segments of the stream. Additionally, the packaging application further directs the processor to: map content segments to output streams having target quality levels by comparing the measurement of the quality of the content segments to the target quality levels of the output streams, where at least one mapping to an output stream having a specific target quality level is based upon a content segment being encoded with the lowest maximum bitrate that achieves the specific target quality level; and generate a set of output streams where each output stream includes content segments encoded at different maximum bitrates.

In a further embodiment, the plurality of streams in the received content are generated from source content by multiple encoders that each encode one of the plurality of streams encoded by multiple encoders.

In a yet still further embodiment, the source content is received and encoded in real time using single-pass encoding.

In another embodiment again, the plurality of streams are encoded at different resolutions.

In additional embodiments, the set of output streams includes at least one output stream that includes content segments encoded at different resolutions.

In a further embodiment, measuring the quality of the content segments includes measuring the quality of streams from the plurality of streams having different resolutions.

In a still further embodiment, measuring the quality of the content segments at different resolutions includes using at least one measurement process selected from the group consisting of: comparing the number of encoded bits per pixel, measuring the mean squared error between a low resolution frame of video scaled to meet a higher resolution frame of video, and analyzing the contrast value of one or more frames in a video.

In a still yet additional embodiment, the plurality of streams are described in a manifest file that includes tags identifying resolution discontinuities within a stream.

In a still yet further embodiment again, measuring the quality of the content segments includes using at least one measurement process selected from the group consisting of: structural similarity; peak signal to noise ratio; and mean opinion score.

In a still further again embodiment, measuring the quality of the content segments includes decoding the content segments and measuring the quality of the decoded content segments.

In a yet additional embodiment, measuring the quality of content segments in a plurality of streams includes: decoding content segments from a first stream to measure a first set of quality parameters for the first stream, where the first set of parameters includes a second subset of parameters; partially decoding at least a second stream to measure the second subset of parameters for the second stream; determining the quality of the first stream using the first set of parameters; and determining the quality of the second stream using parameters from the first set of parameters of the first stream and the second subset of parameters for the second stream.

In a yet again still additional embodiment, the first set of parameters includes contrast and the second set of parameters includes at least one parameter selected from the group consisting of: average quantization parameter (QP), maximum QP, and minimum QP.

In a still yet additional embodiment, measuring the quality of a content segment includes determining the quality of the content segment based upon measurements of the quality of a plurality of frames within the content segment.

In another embodiment, determining the quality of the content segment based upon measurements of the quality of a plurality of frames within the content segment includes taking a weighted average of the measured qualities of the plurality of frames from the content segment in which lower quality scores have higher weights.

In yet another embodiment, determining the quality of the content segment based upon measurements of the quality of a plurality of frames within the content segment includes selecting the quality of the frame from the plurality of frames having the lowest measured quality as the quality of the content segment.

In a yet still further embodiment, determining the quality of the content segment based upon measurements of the quality of a plurality of frames within the content segment includes selecting the average quality of the plurality of frames as the quality of the content segment.

In a yet still another embodiment, content segments within a stream can vary in duration; and measuring quality of a content segment includes modifying the quality score based upon the duration of a content segment.

In a yet still another embodiment again, the target quality level is generated based on the quality levels of previously mapped content segments.

In a yet again still further embodiment, the target quality level is a range of specific values.

In a still yet further embodiment, generating a set of output streams further includes generating a quality based streaming manifest that describes the set of output streams.

In a still additional embodiment, wherein mapping content segments to output streams having target quality levels includes selecting content segments encoded at a higher maximum bitrate than a target minimum available network bandwidth.

In a yet still another embodiment, the method includes: receiving playback condition data; generating an aggressiveness factor based on the playback condition data; and wherein mapping content segments to output streams includes selecting content segments based at least in part upon the aggressiveness factor.

A further includes: receiving content including a plurality of streams at a content server system, where: the plurality of streams are encoded at different maximum bitrates; each stream is divided into content segments; and the quality varies between content segments in each stream based upon the content encoded by the content segment; measuring the quality of the content segments using the content server system; generating quality metadata describing the content segments based upon the content segment quality measurements using the content server system; transmitting the quality metadata to a playback device using the content server system, where the playback device; measures playback conditions; selects content segments based upon the measured playback conditions and quality metadata describing the content segments; and requests the selected content segments.

In a yet further embodiment, the plurality of streams in the received content are generated from source content by multiple encoders that each encode one of the plurality of streams encoded by multiple encoders.

In yet still another embodiment, the source content is received and encoded in real time using single-pass encoding.

In a still yet further embodiment, the plurality of streams are encoded at different resolutions.

In a yet further embodiment, the set of output streams includes at least one output stream that includes content segments encoded at different resolutions.

In a yet again additional embodiment, measuring the quality of the content segments includes measuring the quality of streams from the plurality of streams having different resolutions.

In a still another embodiment, measuring the quality of the content segments at different resolutions includes using at least one measurement process selected from the group consisting of: comparing the number of encoded bits per pixel, measuring the mean squared error between a low resolution frame of video scaled to meet a higher resolution frame of video, and analyzing the contrast value of one or more frames in a video.

In a yet still additional embodiment again, the plurality of streams are described in a manifest file that includes tags identifying resolution discontinuities within a stream.

In yet again another embodiment, measuring the quality of the content segments includes using at least one measurement process selected from the group consisting of: structural similarity; peak signal to noise ratio; and mean opinion score.

In a yet further embodiment, measuring the quality of the content segments includes decoding the content segments and measuring the quality of the decoded content segments.

In a still yet further embodiment, measuring the quality of content segments in a plurality of streams includes: decoding content segments from a first stream to measure a first set of quality parameters for the first stream, where the first set of parameters includes a second subset of parameters; partially decoding at least a second stream to measure the second subset of parameters for the second stream; determining the quality of the first stream using the first set of parameters; and determining the quality of the second stream using parameters from the first set of parameters of the first stream and the second subset of parameters for the second stream.

In a still yet another embodiment, the first set of parameters includes contrast and the second set of parameters includes at least one parameter selected from the group consisting of: average quantization parameter (QP), maximum QP, and minimum QP.

In a still yet further embodiment, measuring the quality of a content segment includes determining the quality of the content segment based upon measurements of the quality of a plurality of frames within the content segment.

In a yet still further embodiment, determining the quality of the content segment based upon measurements of the quality of a plurality of frames within the content segment includes taking a weighted average of the measured qualities of the plurality of frames from the content segment in which lower quality scores have higher weights.

In a yet again further embodiment, determining the quality of the content segment based upon measurements of the quality of a plurality of frames within the content segment includes selecting the quality of the frame from the plurality of frames having the lowest measured quality as the quality of the content segment.

In a still yet additional embodiment again, determining the quality of the content segment based upon measurements of the quality of a plurality of frames within the content segment includes selecting the average quality of the plurality of frames as the quality of the content segment.

In an additional embodiment, content segments within a stream can vary in duration; and measuring quality of a content segment includes modifying the quality score based upon the duration of a content segment.

In a still further embodiment, the target quality level is generated based on the quality levels of previously mapped content segments.

In a yet further additional embodiment, the target quality level is a range of specific values.

In a yet further embodiment, generating a set of output streams further includes generating a quality based streaming manifest that describes the set of output streams.

In an additional embodiment again, mapping content segments to output streams having target quality levels includes selecting content segments encoded at a higher maximum bitrate than a target minimum available network bandwidth.

Another further embodiment includes: receiving playback condition data; generating an aggressiveness factor based on the playback condition data; and wherein mapping content segments to output streams includes selecting content segments based at least in part upon the aggressiveness factor.

A still yet additional embodiment includes: a processor; a network interface; and a memory connected to the processor, where the memory contains a content player application. In addition, the content player application directs the processor to: receive quality metadata describing a plurality of streams, where: the plurality of streams are encoded at different maximum bitrates; each stream is divided into content segments; and the quality varies between content segments in each stream based upon the content encoded by the content segment. The content player application also directs the processor to: measure available bandwidth via the network interface; and request content segments from the plurality of streams based upon the available network bandwidth and the quality metadata describing the plurality of streams, where the requested content segments include content segments encoded at a maximum bitrate and having quality that is the lowest maximum bitrate that achieves a target quality level.

In a still yet additional embodiment, the received quality metadata describing a plurality of streams is contained within at least one manifest file.

In a yet further additional embodiment, requesting content segments from the plurality of streams further includes selecting content streams encoded at different maximum bitrates at a given available network bandwidth based upon the quality of the content segments.

In a still additional embodiment, the plurality of streams are encoded at different resolutions; and requesting content segments from the plurality of streams further includes selecting content streams having different resolutions at a given available network bandwidth based upon the quality of the content segments.

In a yet again further embodiment, the quality of the content segments at different resolutions may be selected by using at least one measurement process selected from the group consisting of: comparing the number of encoded bits per pixel, measuring the mean squared error between a low resolution frame of video scaled to meet a higher resolution frame of video, and analyzing the contrast value of one or more frames in a video.

In a still yet again additional embodiment, requesting content segments from the plurality of streams further includes selecting content segments from the plurality of streams based upon a calculated bitrate, where the calculated bitrate is the minimum bitrate required to download a window of content from a given stream without playback interruption given content segments currently buffered by the content player.

In a yet further embodiment again, the calculated bitrate is constrained to be no less than the average bitrate of the given stream.

In a still yet another embodiment again, the window of content is selected from the group consisting of: a predetermined duration of content, and remaining content segments in a stream.

In still another further embodiment again, the quality metadata describes the segment sizes of content segments.

In a still yet further embodiment again, the quality metadata is contained within a manifest file identifying byte ranges of each of the content segments; and the content player application further directs the processor to determine the sizes of the content segments from the byte ranges of each of the content segments in the manifest file.

In a yet additional further embodiment again, the quality metadata is contained within a manifest file containing URLs identifying convent segments; and the content player application further directs the processor to determine the sizes of the content segments by requesting header information using URLs from the manifest file.

In a still yet further additional embodiment, the plurality of streams described by the quality metadata are generated from source content by multiple encoders that each encode one of the plurality of streams.

In further additional embodiment, the source content is received and encoded in real time using single-pass encoding.

In a still yet further additional embodiment again, the target quality level is generated based on the quality levels of previously requested content segments.

In a still yet further embodiment, the target quality level is determined based upon a moving average of a set of content segments encoded at the same maximum bitrate.

In a yet further additional embodiment, the moving average is a weighted average with content segments described as having lower quality levels by the quality metadata having a higher weight compared to content segments described as having higher quality levels by the quality metadata.

In an additional embodiment, the target quality level is a range of specific quality values.

In a still another further embodiment, requesting content segments from the plurality of streams also includes selecting content segments encoded at a higher maximum bitrate than the available network bandwidth.

In still another embodiment again, the content player application further directs the processor to: generate an aggressiveness factor based on the playback condition data; and wherein request content segments from the plurality of streams based upon the available network bandwidth and the quality metadata describing the plurality of streams includes selecting content segments based at least in part upon the aggressiveness factor, the available network bandwidth, and the quality metadata describing the selected content segments.

In an additional embodiment again, the playback condition data includes at least one piece of data selected from the group consisting of: playback duration, bandwidth variation, current buffer level and current bandwidth.

A yet further embodiment again includes: a processor; at least one network interface; and a memory connected to the processor, where the memory contains a redirection application. In addition, the redirection application directs the processor to: receive quality metadata describing a plurality of streams, where: the plurality of streams are encoded at different maximum bitrates; each stream is divided into content segments; and the quality varies between content segments in each stream based upon the content encoded by the content segment. Furthermore, the redirection application directs the processor to receive a plurality of segment requests via the network interface; generate segment redirection responses from the plurality of streams based upon the available network bandwidth and the quality metadata describing the plurality of streams, where the segment redirection responses include content segments encoded at a maximum bitrate and having quality that is the lowest maximum bitrate that achieves a target quality; and transmit the segment redirection responses via the network connection.

In a further embodiment, the received quality metadata describing a plurality of streams is contained within at least one manifest file.

In a still further embodiment, the plurality of streams described by the quality metadata are generated from source content by multiple encoders that each encode one of the plurality of streams.

In a still yet further embodiment, the source content is received and encoded in real time using single-pass encoding.

In a further embodiment again, generating segment redirection responses from the plurality of streams based upon the available network bandwidth and the quality metadata describing the plurality of streams further includes selecting content streams encoded at different maximum bitrates at a given available network bandwidth for inclusion in segment redirection responses that are based upon the quality of the content segments.

In a yet further embodiment, the plurality of streams are encoded at different resolutions; and generating segment redirection responses from the plurality of streams based upon the available network bandwidth and the quality metadata describing the plurality of streams further includes selecting content streams having different resolutions at a given available network bandwidth for inclusion in segment redirection responses that are based upon the quality of the content segments.

In further embodiment again, the quality of the content segments at different resolutions may be selected by using at least one measurement process selected from the group consisting of: comparing the number of encoded bits per pixel, measuring the mean squared error between a low resolution frame of video scaled to meet a higher resolution frame of video, and analyzing the contrast value of one or more frames in a video.

In a further additional embodiment, generating segment redirection responses from the plurality of streams further includes selecting content segments from the plurality of streams based upon a calculated bitrate, where the calculated bitrate is the minimum bitrate required to download a window of content from a given stream without playback interruption given content segments currently buffered by the content player.

In further still yet another again embodiments, the calculated bitrate is constrained to be no less than the average bitrate of the given stream.

In an additional embodiment, the window of content is selected from the group consisting of: a predetermined duration of content, and remaining content segments in a stream.

In another embodiment, measuring the quality of the content segments includes using at least one measurement process selected from the group consisting of: structural similarity; peak signal to noise ratio; and mean opinion score.

In an additional embodiment, the target quality level is generated based on the quality levels of content segments included in previously generated segment redirection responses.

In a yet further embodiment, the target quality level is determined based upon a moving average of a set of content segments encoded at the same maximum bitrate.

In another additional embodiment, the moving average is a weighted average with content segments described as having lower quality levels by the quality metadata having a higher weight compared to content segments described as having higher quality levels by the quality metadata.

In another additional embodiment again, the target quality level is a range of specific quality values.

In a still additional embodiment, generating segment redirection responses from the plurality of streams also includes selecting content segments encoded at a higher maximum bitrate than the available network bandwidth.

In a further embodiment again, the method also includes: receiving playback condition data; generating an aggressiveness factor based on the playback condition data; and wherein generating segment redirection responses includes selecting content segments based at least in part upon the aggressiveness factor, the available network bandwidth, and the quality metadata describing the selected content segments.

In a yet further additional embodiment, the playback condition data includes at least one piece of data selected from the group consisting of: playback duration, bandwidth variation, current buffer level and current bandwidth.

In a still yet additional embodiment, the segment redirection responses include content segments by including references to locations from which content segments can be retrieved.

In another further embodiment, the quality based redirection server system acts as a proxy server and the segment redirection responses include content segments retrieved from another server system.

BRIEF DESCRIPTION OF THE DRAWINGS

FIG. 8 conceptually illustrates constant quality bitrate mapping in accordance with an embodiment of the invention.

DETAILED DESCRIPTION OF THE DRAWINGS

Figure 1:
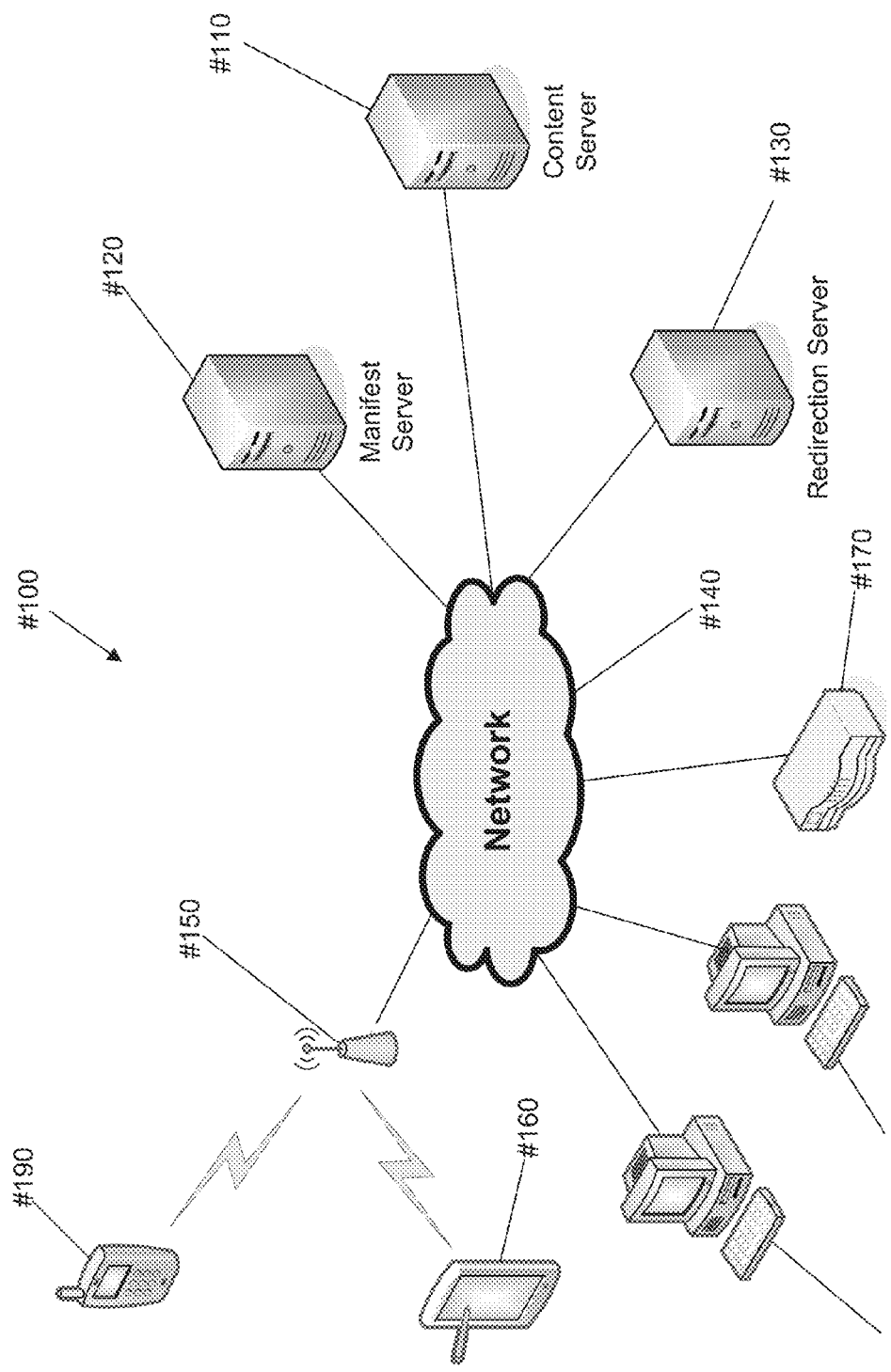
FIG. 1 is a network diagram of a quality based streaming system in accordance with an embodiment of the invention.

Turning now to the drawings, systems and methods for performing quality based streaming in accordance with various embodiments of the invention are illustrated. Many current streaming systems employ adaptive bitrate streaming. Adaptive bitrate streaming decisions are typically based upon the relationship between the current available bandwidth (i.e. network capacity at the playback device) and the maximum bitrate utilized in the encoding of the content. Quality based streaming systems in accordance with many of the embodiments of the invention utilize information about the content of the media in addition to the current available bandwidth and the maximum bitrate utilized in the encoding of the content to make stream switching decisions. In several embodiments, the goal of a quality based streaming system is to achieve a predetermined quality level of content playback as efficiently as possible given available network and/or processing resources. In this way, a quality based streaming system can utilize less than the available network and/or processing resources to stream content in circumstances where a target quality can be achieved at a lower bitrate. Similarly, quality based streaming systems can utilize additional network resources available during the downloading of lower bitrate streams to buffer additional content. By buffering additional content, the quality based streaming system can download segments of content from a stream encoded at a maximum bitrate that is higher than the available network bandwidth for brief periods. In many instances, a target quality level cannot be achieved by encoding video at a maximum bitrate that is less than the current available bandwidth. Traditional adaptive bitrate streaming systems only enable downloading of a segment of video from a stream encoded at a maximum bitrate which is less than the currently available network bandwidth. Quality based streaming systems in accordance with many embodiments of the invention may briefly violate this requirement by permitting downloading of content segments from a stream encoded at a maximum bitrate that exceeds the currently available network bandwidth to achieve a target quality level. In this way, the system can utilize knowledge of the content to allocate bits where they will have the most significant impact on the quality of the content, avoided downloading media encoded in a higher bitrate than necessary when the characteristics of the video do not require. Potentially, this provides a sufficient buffer to allow downloading of content that is of a higher bitrate than would otherwise be supported in conventional adaptive streaming systems.

When encoding video for use in a quality based streaming system, an encoder can take source media and encode it into multiple alternative content streams, having different maximum bitrates and/or resolutions. These streams can be divided into smaller segments of various sizes. The locations of each of these segments at each bitrate can be stored as manifest data that can be stored in a separate manifest file or used to populate a database that can be used to dynamically generate manifest files. This manifest file can subsequently be utilized to download content segments from one or more of the streams. In many embodiments, the alternative streams of content have already been encoded, and a manifest is generated that enables quality based streaming using the pre-existing content. In other embodiments, the content is encoded specifically for use in quality based streaming and may include quality metadata embedded within the encoded content as user data, a metadata track and/or using any other mechanism appropriate to the requirements of a given application.

Streaming of media in accordance with many embodiments of the invention can be accomplished from a variety of sources. In many embodiments, the media to be streamed may be pre-encoded and stored on a server or CDN. In other embodiments, source media that is captured live is received and encoded in real time using single-pass encoding and/or uploaded to servers or CDNs for distribution. In yet other embodiments, multiple encoders may be present to facilitate real time encoding of multiple alternative content streams. A key difference with real time encoded content is that only single-pass encoding can be performed. Single pass encoding analyzes and encodes the data "on the fly." Single pass encoding can be used when the encoding speed is most important. Single-pass encoding is usually controlled by a fixed quality setting, a bitrate range, or an average bitrate setting. Contrast this with multi-pass encoding which is typically used when quality is an important factor. Because each pass in the multi-pass encoding process equates to one pass through of the input data, multi-pass encoding can take much longer than single-pass encoding. In some embodiments, two pass encoding may be used that analyzes the input data in the first pass and stores the results in a log file. In the second pass the stored log file data is used to achieve the best encoding quality. In some embodiments, two pass encoding is done on video files which is controlled by the average bitrate setting, the bitrate range setting, and/or by the target video file size setting.

Streaming of media may be improved by adding quality information. Quality information refers to techniques for scoring of the perceived quality of the content. In several embodiments of the invention, the source media is analyzed to determine quality. In several embodiments, quality information is determined by utilizing one or more processes that generate one or more quality scores based upon the content of the media. These processes may include analyzing quality of different segments at different resolutions. For example, a comparison of a video segment encoded at X Mbps at resolution Y may be compared to a video segment encoded at A Mpbs at resolution B. In further embodiments, analysis may include (but is not limited to) the number of encoded bits per pixel, the mean squared error between a low resolution frame of video scaled to meet a higher resolution frame of video, the contrast value of one or more frames in a video, the average quantization values of frames of video, or a combination of these or other processes. In certain embodiments, the quality data may be utilized to make encoding decisions. For example, if a bitrate layer is encoded that meets a desired target quality, encoding at higher bitrate layers may not be needed. This quality information may be stored as a separate metadata file or integrated into container files that contain encoded content segments, and/or manifest files. In a number of embodiments, quality data is stored on a server that is utilized to generate manifest files and/or manage requests for content from playback devices (see discussion of redirection servers below). In other embodiments, quality data is transmitted to a playback device and the playback device utilizes the quality data in making stream switching decisions. In yet still other embodiments, quality information may already be present in the source media. In further embodiments, analytics regarding the constant streaming process and quality information may be captured for later processing.

The performance of a quality based streaming system in accordance with many embodiments of the invention can be significantly enhanced by generating a quality based streaming manifest. In many embodiments, a target quality level is set for each stream described in the manifest, which may then be satisfied by segments of different streams based on the quality metadata. In certain embodiments, segments may be selected which fall in a band of quality values. These bands of quality values may allow for the creation of multiple sets of segment lists. For example, a set of segment lists may be generated where one list has a mean opinion score quality level between 0.5 and 1.5 and another list of segments has a mean opinion score quality level of 1.5 to 2.5. In further embodiments, the quality level bands could be utilized that have different sizes. For example, these sizes could be labeled as LOW, MEDIUM, and HIGH wherein the quality level band with LOW size achieves a segment list with more constant quality while the quality level band with HIGH size has more flexibility for quality variation. Alternatively, the band may be generated by choosing segments such that the bitrate variations are reduced within a band and therefore creating LOW (high bitrate variations), MID, and HIGH (low bitrate variation) bands. If a content segment from amongst the alternative encodings of a segment of content satisfies a target quality level, then a reference to the content segment satisfying the target quality level can be added to the manifest. As a result of utilizing target quality levels to assemble the streams, a single stream described in the manifest can include content segments encoded at different maximum bitrates and/or with different resolutions. In certain embodiments, the quality based streaming manifest may be stored as a manifest file and/or manifest data that can be used to dynamically generate manifest files on a server from which playback devices can request manifest files for quality based streaming of content. In other embodiments, the quality based streaming manifest may be stored on a playback device. In yet other embodiments, the quality based streaming manifest may be used in place of a conventional manifest file created to support adaptive bitrate streaming based upon available network bandwidth and the maximum bitrates at which each of the streams are encoded.

In embodiments where a quality based streaming manifest is generated in real time and/or selection of content segments to achieve quality based streaming is performed in real time, the target quality level at a given set of streaming conditions may be influenced based on conditions about the playback environment. In a number of embodiments, an aggressiveness factor may be considered to determine a target quality based on certain conditions including, but not limited to, buffer level, position of playback, and the current bitrate of the stream being delivered. In still another embodiment, the target quality level may be either a constant quality or a band of quality. In many embodiments, the aggressiveness factor can also be utilized in performing stream switching decisions given a set of playback conditions. In further embodiments, stream switching decisions may be affected by the downstairs bitrate, which is calculated based upon a minimum bandwidth required to stream a portion of content given the amount of content that is currently buffered. Specific processes for calculating the downstairs rate are discussed further below.

Constant quality streaming of media encoded in the manner outlined above can be coordinated by a playback device in accordance with certain embodiments of the invention. In many embodiments, the playback device receives quality metadata and utilizes the quality metadata to perform stream switching decisions to achieve a target quality of playback for a given set of playback decisions. As can readily be appreciated, a shift in the playback conditions may necessitate a change in the target quality. In still further embodiments, an aggressiveness factor may be considered to evaluate the likelihood of switching streams based on certain conditions including, but not limited to, buffer level, position of playback, and the current maximum or average bitrate of the stream being delivered. In still another embodiment, the target quality level may be either a constant quality or a band of quality.

Constant quality streaming of media encoded in the manner outlined above can also be coordinated by a redirection server. In certain embodiments, a redirection server is utilized to handle segment requests from other devices. In a number of embodiments, the redirection server acts as a proxy and fetches segments to stream to the client. In many of these embodiments, a quality based streaming manifest is stored on the redirection server in the form of manifest data and/or a manifest file. When a certain segment is requested, the redirection server may redirect the request to another stream segment in accordance with several embodiments of the invention. The redirection can be achieved by providing a reference, such as (but not limited to) a URL to a content segment as an alternative to a URL received from a content segment. In a number of embodiments, the server maintains the state of the playback device and/or the playback device provides information concerning playback positions (e.g. buffered content, network bandwidth, CPU resources) to enable the redirection server to select an appropriate content segment to achieve a target quality level. As noted above, the selection may be subject to the determination of an aggressiveness factor based upon the playback conditions. The aggressiveness factor can be determined at the playback device or on the redirection server based upon information including information received from the playback device. In still another embodiment, the target quality level may be either a constant quality or a band of quality.

While much of the discussion that follows relates to the quality based streaming of video content, similar techniques can be utilized to perform quality based streaming of a variety of media data including audio, and/or interactive content. Accordingly, quality based streaming systems should not be considered as limited to performing quality based streaming of video content. Systems and methods for performing quality based streaming of content in accordance with various embodiments of the invention are discussed further below.

Quality Based Streaming Systems

A quality based streaming system in accordance with an embodiment of the invention is illustrated in FIG. 1. The constant quality streaming system #100 contains a content server #110 that is connected to a network #140. A manifest server #120 and a redirection server #130 may also be connected to the network #140. Additionally, the system includes a variety of playback devices that can communicate with the various server systems via the network including (but not limited to) personal computers #180, stand-alone playback devices #170, mobile phones #190, and personal computing devices #160, some which may connect to the network #140 via a wireless access point #150.

The quality based streaming system #100 includes a content server #110 configured to deliver content that is either pre-encoded or encoded at the time of delivery. In many instances, media content (such as, but not limited to, video) is encoded at different maximum bitrates and segmented into smaller portions. The performance of an adaptive bitrate streaming system in accordance with some embodiments of the invention can be significantly enhanced by encoding each portion of the source video in each of the alternative streams in such a way that the segment of video is encoded in each stream as a single (or at least one) closed group of pictures (GOP) starting with an Instantaneous Decoder Refresh (IDR) frame, which is an intra frame. In a number of embodiments, a manifest file helps to retrieve individual content segments and can include lists of the locations of each of the segments and/or identify top level index files that provide information from which index information can be retrieved within files containing content segments that enables the downloading of the content segments. In some embodiments, the segments are stored in a single file which may be accessed through byte-range requests. In other embodiments, each content segment is stored in a separate file. In a number of embodiments, the content segments are conceptual and are simply blocks of content within a content stream. In further embodiments, the content server #110 generates a quality based streaming manifest. In a number of embodiments the content server may generate a quality based streaming media-file. In still further embodiments, the content server #110 may generate a quality based streaming media-file containing content segments and quality metadata describing the content segments. In the illustrated embodiment, the content server is an HTTP server. In other embodiments, the content server can be any processing device including a processor and sufficient resources to perform the encoding or processing of source media (including, but not limited to, video, audio, quality analysis, and/or subtitles). A variety of playback devices can request segments of the content from the content server based on the manifest via a network #140 such as the Internet.

In many embodiments, the quality based streaming system #100 includes a manifest server #120 configured to deliver manifest files. The manifest files can be pre-stored or dynamically generated from manifest data maintained by the manifest server #120. In many instances, the manifest is utilized to locate segments of content to be delivered to a playback device by a system other than the content server #110, such as (but not limited to) a manifest server #120. In certain embodiments, the manifest server #120 is distinct from the content servers #110 and/or may be located in a different data center. For example, a content server may be provided by a first cloud based service and the content servers may form part of a content distribution network. As can readily be appreciated, the specific location and distribution of the manifest and/or content servers is largely dependent upon the requirements of a given application. In some embodiments, a quality based streaming manifest may be generated and/or stored on the manifest server #120 and delivered to a playback device in place of a manifest typically distributed in a conventional adaptive bitrate streaming system in which the content segments in each content stream are encoded at the same maximum bitrate and/or resolution.

The quality based streaming system #100 may also include a redirection server #130 configured to redirect segment requests. Typically, a manifest contains a list of URLs which can be accessed to provide a segment of content. In many embodiments, a quality based streaming manifest may be utilized by the redirection server #130 to redirect requests specifying a URL of content segment to a different URL of a different content segment to provide quality based streaming. In other embodiments, the redirection server may utilize quality information such that a request for a specific segment at a URL defined by a typical manifest will be redirected to provide a content segment selected via a mapping in order to achieve a target quality level. Redirection can be performed by acting as a proxy server that fetches content segments and provides them to a playback device and/or by providing identifiers (e.g. URLs) that can be utilized by a playback device to retrieve the identified content segments.

A playback device may decode and present content for viewing. As can readily be appreciated, certain devices may implement a playback client application to stream content. In a number of embodiments, a playback device streams content from a network #140. In many embodiments, a playback device requests segments of content from a content server #110 as defined in a quality based manifest. In other embodiments, a playback device may request a segment as defined in a typical manifest file, which is redirected by a redirection server #130 to a different segment that is not encoded at the highest maximum bitrate that is less than the current network bandwidth. The redirection decision can be based on a number of factors including (but not limited to) the resolution of the content, the frame rate of the content, and the segments encoded with the lowest maximum bitrate which achieves a target quality. The lowest maximum bitrate may be either higher or lower than the current network bandwidth. Redirection decisions can also be based upon the size of the content segments. In many embodiments, analytic data about the system may be stored for future use. For example, quality based streaming analytics may be used to create any number of encoding recommendations, profile creation lists, and/or source content preprocessing tasks. In many embodiments, a content server system accumulates data concerning content segments selected for playback and can re-encode content segments to provide content that is more likely to achieve a target quality at a given observed network bandwidth. As can readily be appreciated, the use of data collected by a content server in the creation of encoding profiles and/or re-encoding of content is logically only limited by the requirement of a given application. In the illustrated embodiment, the playback devices are represented by particular devices, but may also include (but are not limited to) consumer electronics, DVD players, Blu-Ray players, televisions, video-game consoles, tablets, and other devices that are capable of connecting to a server and playing back content.

While a variety of quality based streaming systems are described above with reference to FIG. 1, the specific components utilized within a quality based streaming system and the manner in which content is selected for streaming based upon achieving a target quality at a given network bandwidth and/or processing resources are largely dependent upon the requirements of specific applications. Content server systems that can be utilized in quality based streaming systems in accordance with various embodiments of the invention are discussed further below.

Content Server Systems

Figure 2:
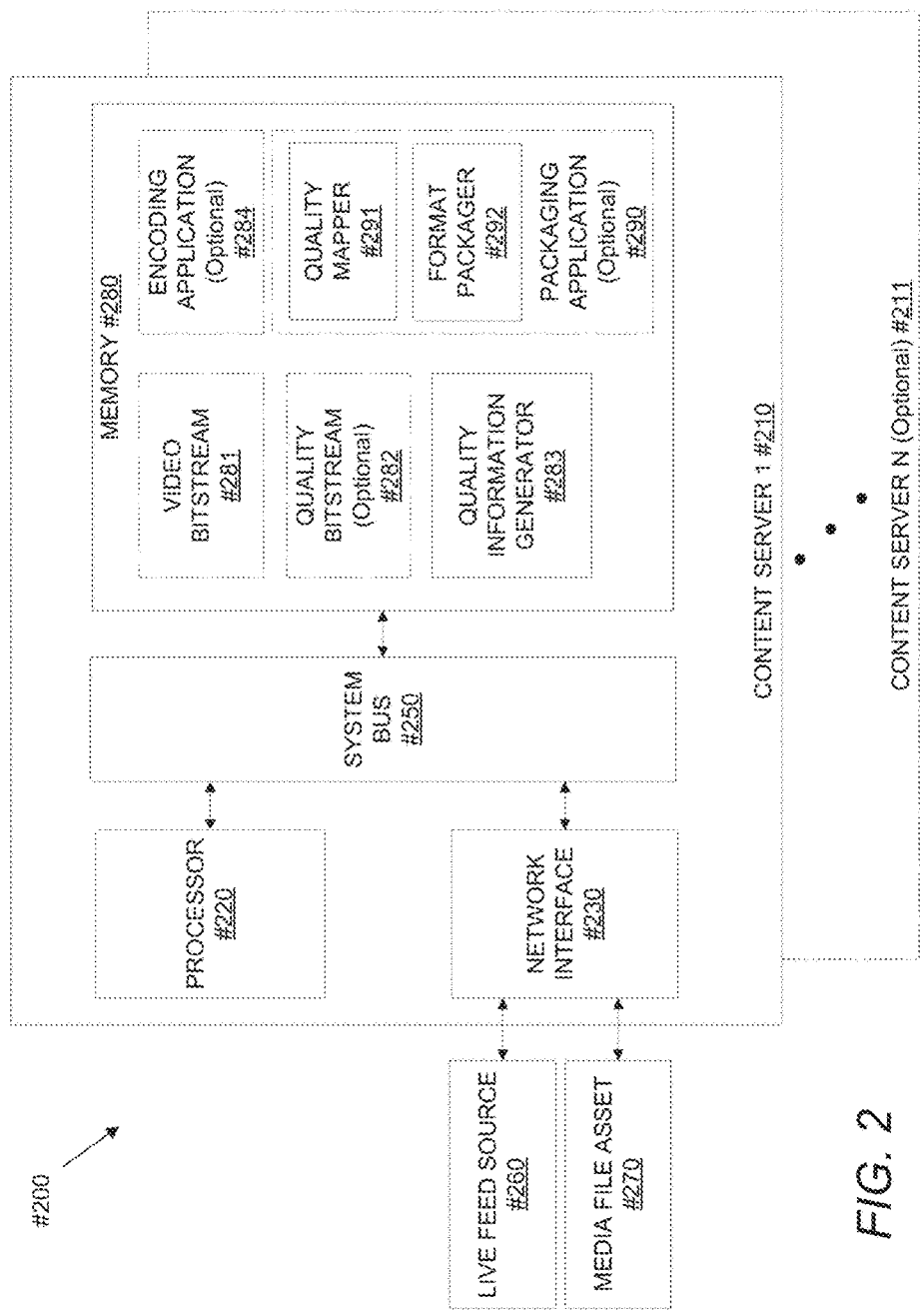
FIG. 2 conceptually illustrates a content server in accordance with an embodiment of the invention.

A content server system that can be utilized to stream content based upon quality in accordance with an embodiment of the invention is illustrated in FIG. 2. Content server system #210 includes a processor #220, network interface #230, system bus #250, and memory #280. Certain embodiments may receive a live feed source #260 and/or a media file asset #270. In a number of embodiments, the live feed source #260 and/or a media file asset #270 may be connected directly to the system bus without the need for a network interface #230 (e.g. via a removable storage device). Further embodiments may contain additional encoding servers #211. In many embodiments of the invention, the content server memory #280 may contain a quality information generator application #283 that configures the processor to generate quality information based upon the encoded content. In addition, the server memory #280 can contain an encoding application #284, as well as a packaging application #290. The packaging application #290 can include a quality mapper #291 that can utilize quality information describing the content to create a mapping between segments that can be utilized to perform quality based streaming. The packaging application #290 can also include and a format packager application #292 that utilizes mapped segments for packaging into formats suitable for streaming.

While a variety of content server systems are described above with reference to FIG. 2, other server configurations can be implemented as appropriate to the requirements of specific applications in accordance with various embodiments of the invention. Processes for performing quality based streaming using content server systems in accordance with various embodiments of the invention are discussed further below.

Quality Based Streaming Processes

Figure 3:
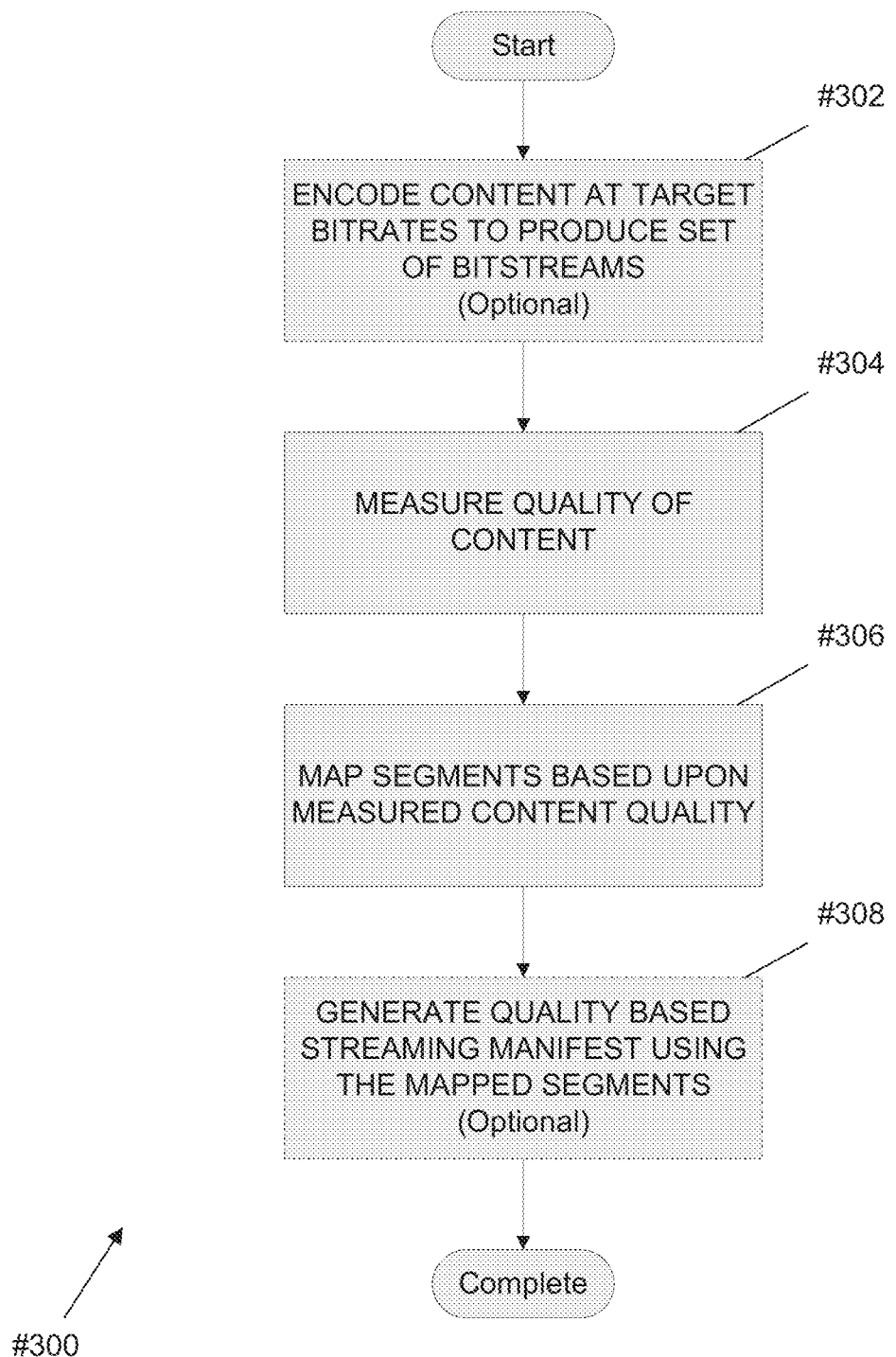
FIG. 3 is a flow chart illustrating a process for constant quality streaming in accordance with an embodiment of the invention.

At a high level, processes for performing quality based streaming involve measuring the quality of content segments for a number of streams of content encoded at different maximum bitrates and/or resolutions, mapping segments of the encoded content to a set of target quality levels, delivering content segments from a stream having a target quality level that can be supported at a given network bandwidth, and adjusting the target quality level in response to changes in the streaming conditions. The target quality level may be based upon a moving average. This moving average may be determined over a time window by averaging sets of segments belonging to specific bit-rate groups. In some embodiments, a weighted average is used for the target quality level. In further embodiments, the target quality can be based on a weighted average where different weights are assigned to different quality levels. A process for performing quality based streaming in accordance with an embodiment of an invention is shown in FIG. 3.

The process #300 may include encoding (#302) content at target maximum bitrates to produce a set of bitstreams, and measuring (#304) the resulting quality of segments of the encoded content in each bitstream. Segments from the different encoded bitstreams can be mapped (#306) to specific streams based upon the measured content quality and the target quality levels of the streams. The mappings can then be utilized to perform quality based streaming, which can involve generating (#308) a quality based streaming manifest. The manifest can take the form of a manifest file and/or manifest data that can be used to dynamically generate a quality based manifest file at the time the content is requested by a playback device. In certain embodiments, the manifest file and/or manifest data may be structured to access content segments via a byte-range request instead of via URLs. Content players may need to be made aware of the different resolutions that may occur. This can be accomplished in certain embodiments by methods including (but not limited to), sending the switching information as side data with the quality data, using tags such as EXT-DISCONTINUITY-TAG within manifest files, and using "periods" allowed in formats such as MPEG DASH to separate and group segments belonging to the same encoding bitstream setting. As is discussed in more detail below, a quality based streaming manifest is utilized in many embodiments to determine content segments to select during quality based streaming. In certain embodiments, the quality measurements are provided to a playback device in the form of quality metadata and the playback device uses the quality metadata to make stream switching decisions to achieve quality based streaming in real time.

Measurement of the quality of a set of streams can depend on the characteristics of the stream. When a quality based content stream can be constructed from streams having different resolutions, measurement of quality may include (but is not limited to), analyzing different content segments at different bitrates, content segment sizes, and resolutions. For example, a comparison of a video segment encoded at X Mbps at resolution Y may be compared to a video segment encoded at A Mpbs at resolution B. In still further embodiments, analysis may include (but is not limited to) the number of encoded bits per pixel, the mean squared error between a low resolution frame of video scaled to meet a higher resolution frame of video, the contrast value of one or more frames in a video, the average quantization values of frames of video, or a combination of these or other processes.

In certain embodiments, quality information may be obtained on a set of streams from a subset of those streams. For example, certain measurements vary very little between different bitrate layers (including but not limited to contrast values). Once these values of a subset of streams has been obtained, only partial decoding is necessary in certain other streams. For example, a first set of parameters can be measured from a fully decoded stream and some of those parameters can be used in measuring the quality of a partially decoded stream. In certain embodiments, parameters from the fully decoded stream can include contrast and one or more of average, maximum and/or minimum quantization parameters. The contrast from the fully decoded stream can then be used in combination with one or more of average, maximum and/or minimum quantization parameters from the partially decoded stream to measure the quality of the partially decoded stream. As can readily be appreciated any of a variety of parameters can be utilized to measure quality in fully and partially decoded streams from a set of alternative streams as appropriate to the requirements of specific applications in accordance with various embodiments of the invention. In another embodiment, the quality based streaming system may receive an adaptive streaming manifest file and modify the manifest file to provide for quality based streaming. In still another embodiment, this modification can be the changing of URLs requested by a client.

Although specific processes are described above for performing quality based streaming with reference to FIG. 3, any of a variety of processes for performing quality based streaming can be utilized as appropriate to the requirements of specific applications in accordance with various embodiments of the invention. For example, a number of embodiments of the invention utilize an aggressiveness factor calculated based upon streaming conditions to perform quality based streaming. In other embodiments, the quality of the content may already be measured and provided for mapping. The manner in quality based manifests generated by content server system can be utilized to perform quality based streaming in accordance with several embodiments of the invention is discussed further below.

Process for Performing Quality Based Streaming on a Content Server

Content server systems can perform quality based streaming in a number of ways including (but not limited to) receiving content that has already been encoded, or encoding content in real-time. A content server may receive pre-encoded content in the form of a set of alternative streams encoded at different maximum bitrates and/or resolutions. When the alternative streams are encoded in this way, the quality of the encoded content as determined using processes for scoring quality will vary with respect to the content segments within a stream. Quality information can be generated with respect to the encoded content and/or quality information may be present in encoded content provided to the server. The content server system may then either map URLs taken from within a manifest or rearrange the segments themselves to create a new sequence of content segments for quality based streaming. The mapped segments of content may then be packaged together into formats suitable for adaptive streaming including, (but not limited to), HLS, and MPEG DASH. This may include the generation of a quality based streaming manifest file. In certain embodiments, the quality based streaming manifest file may be transmitted directly to a playback device by the content server system. A quality based streaming manifest can also be transmitted to a redirection server, which uses the manifest to handle redirection requests. In other embodiments, the content server may package the mapped segments and/or the quality metadata to be transmitted to other devices including (but not limited to), CDNs, application servers, redirection servers, or playback devices. In some of these instances, the mapped segments may then be packaged into adaptive streaming formats at other locations separate from the content server. As noted above, content server systems can also provide quality metadata directly to playback devices to enable the playback devices to dynamically perform the mapping in the of stream switching decisions designed to achieve target quality levels appropriate to the streaming conditions.

Figure 4:
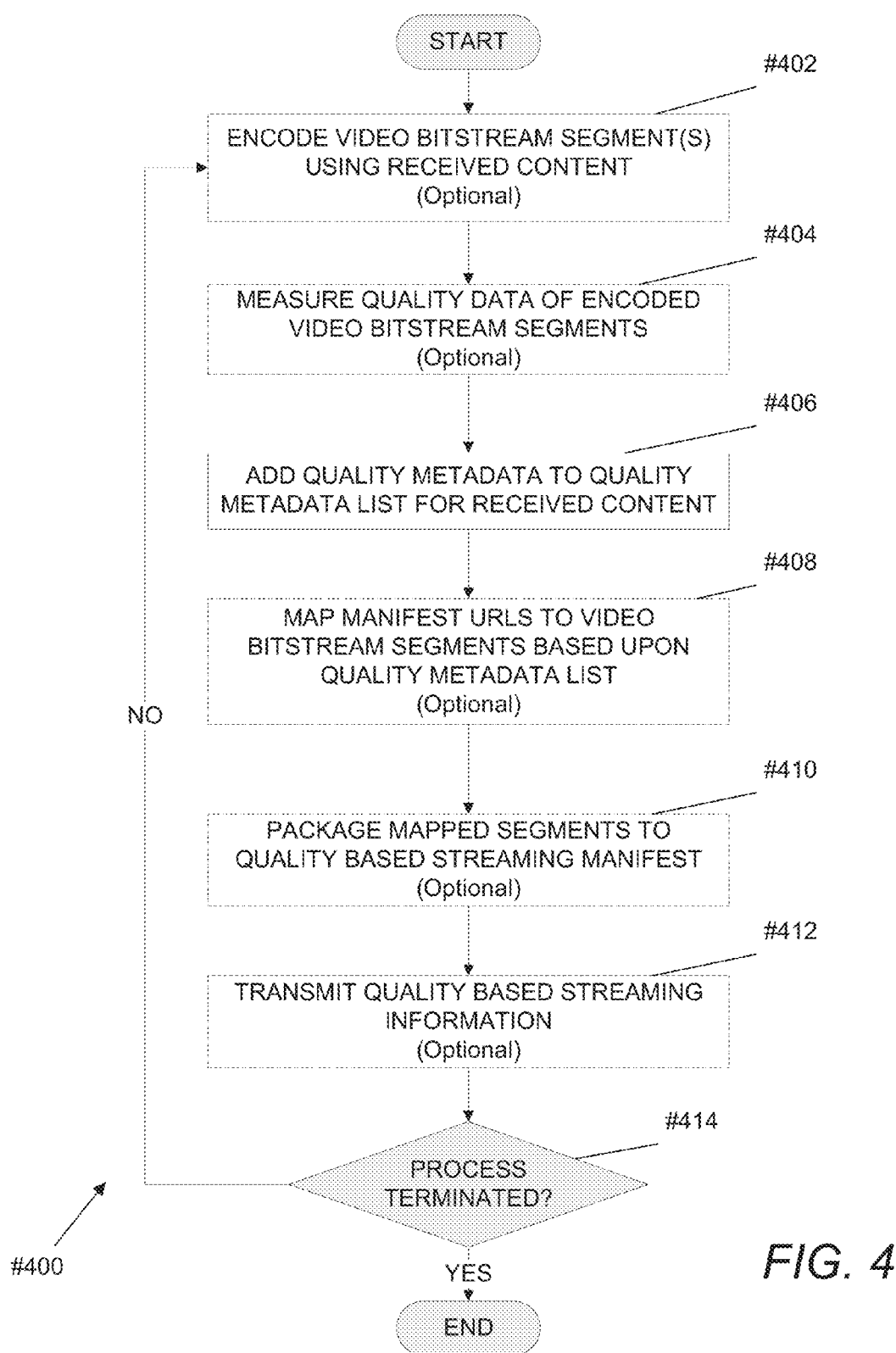
FIG. 4 is a flow chart illustrating a process for generating quality data using a content server for use in quality based streaming in accordance with an embodiment of the invention.

A process for generating quality data using a content server for use in quality based streaming in accordance with an embodiment of the invention is shown in FIG. 4. In many embodiments, the process #400 typically encodes (#402) video bitstream segments using the received content when the content has not already been encoded in accordance with a set of appropriate profiles. In some embodiments, the process #400 may measure (#404) quality data from the encoded content when quality data is not already available. In many embodiments, the process #400 adds (#406) quality metadata to a quality metadata list. The process #400 may also map (#408) manifest URLs to video bitstream segments based upon a quality metadata list in order to enable the use of the manifest file to perform quality based streaming. Additionally, the process #400 can also package (#410) mapped segments into a quality based streaming manifest. In some embodiments, the process #400 includes the transmitting (#412) of the quality based streaming information including (but not limited to) quality metadata, mapped segment data, and quality based streaming manifests. Once encoding has been completed with respect to all of the content, the process completes. Otherwise, more encoding occurs.

Although specific processes performed by content server systems are described above with reference to FIG. 4, any of a variety of processes can be implemented using content server systems to distribute quality data for use in quality based streaming as appropriate to the requirements of specific applications in accordance with various embodiments of the invention. While the processes described above involve the generation of quality data and/or quality based streaming manifests based upon the specific content encoded within segments of video, the specific segment to select for streaming and playback typically depends upon streaming conditions including (but not limited to) the available network bandwidth, the number of recent stream switches, the amount of buffered content, and/or the available processing resources on the playback device. Use of aggressiveness factors that characterize streaming conditions when performing quality based streaming in accordance with various embodiments of the invention will now be discussed in detail below.

Utilizing Aggressiveness Factors in Quality Based Streaming

An aggressiveness factor can be utilized to determine how aggressively a target quality is attempted to be achieved under a given set of streaming conditions. A content server may receive content, and measure quality to provide either the content server or another device with data used to perform quality based streaming. In some embodiments, further information may be utilized including (but not limited to) the amount of buffered content, the available network bandwidth, the position of playback, the number of stream switches that have (recently) occurred, bandwidth variation over time, the size of the content segments, and/or the current maximum bitrate of the streamed content. With such data, an aggressiveness factor may be calculated that can be utilized in the selection content segments within specific streams having associated target quality levels. Effectively, the aggressiveness factor dictates whether to employ a conservative strategy or an aggressive strategy. A conservative strategy may include content segments in a stream having a target quality level based upon being the content segment of the smallest size and having the lowest maximum bitrate that satisfies one of the following two conditions: the lowest maximum bitrate at which the target quality level is achieved; or the highest maximum bitrate that is lower than the available network bandwidth. An aggressive strategy may attempt to include segments of content encoded at a maximum bitrate that exceeds the available network bandwidth in order to achieve the target quality level. In some embodiments, the aggressiveness factor is expressed as a number between 0.0 and 1.0. It can be understood by one skilled in the art that an aggressiveness factor or factors can be expressed in any of a variety of ways and the manner in which a mapping process responds to aggressiveness factor may adjust in any manner appropriate to the requirements of a specific applications. In some embodiments, the aggressiveness factor may be influenced by the maximum bitrate necessary for streaming at a certain point in playback instead of the maximum bitrate necessary for streaming the entire content. Once the aggressiveness factor is set, a mapping may be done which is influenced not just by factors similar to the process shown in FIG. 4, but also the aggressiveness factor. As with the process described above with respect to FIG. 4, the mapped segments may be packaged and/or transmitted to another device, or stored for later future use.

Figure 5:
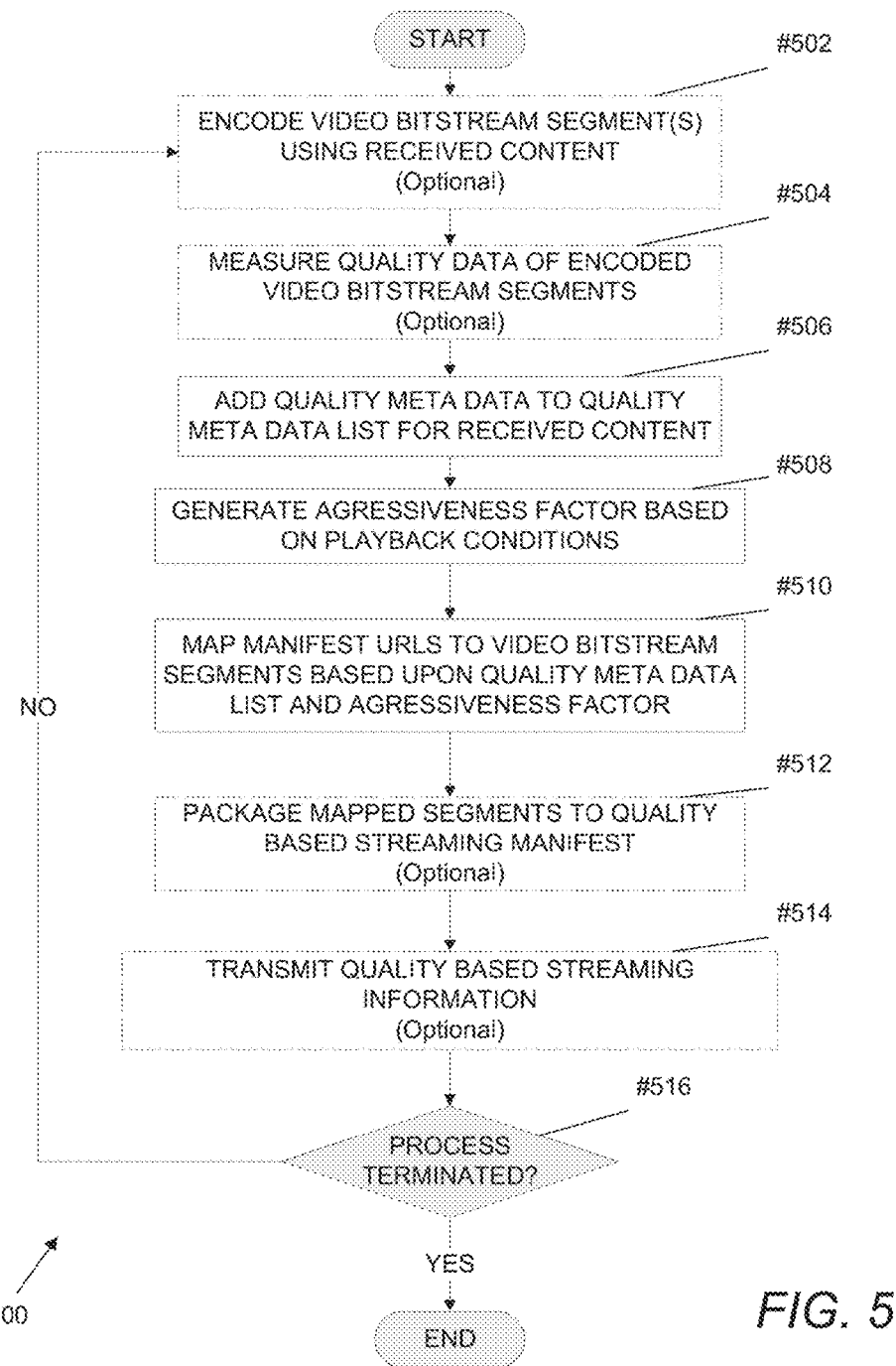
FIG. 5 is a flow chart illustrating a process for constant quality streaming on a content server that utilizes an aggressiveness factor in accordance with an embodiment of the invention

A process for utilizing an aggressiveness factor to determine how aggressively a target quality is attempted to be achieved when performing quality based streaming in accordance with an embodiment of an invention is shown in FIG. 5. The process #500 may encode (#502) video bitstream segments using the received content when the content has not already been encoded in accordance with a set of appropriate profiles. In some embodiments, the process #500 may measure (#504) quality data from the encoded content when quality data is not already available. In many embodiments, the process #500 adds (#506) quality metadata to a quality metadata list. The process #500 generates (#508) an aggressiveness factor based on playback conditions of the stream. Factors that form part of the playback conditions that can go into determining aggressiveness factor include (but are not limited to): network bandwidth conditions measured by a playback device, bandwidth variations, device type (e.g. large screen television, tablet, or mobile phone), content genre (e.g. animation vs action), network type (e.g. WiFi, LAN, mobile), and/or determined by a service provider as appropriate to the requirements of a specific application. As can readily be appreciated, any of a variety of factors that impact stream switching decisions based upon content quality can be considered as part of the playback conditions used to determine an aggressiveness factor as appropriate to the requirements of a given application in accordance with an embodiment of the invention. The process #500 may also map (#510) manifest URLs to video bitstream segments based upon a quality metadata list and an aggressiveness factor in order to provide quality based streaming in accordance with the invention. Additionally, the process #500 can also package (#512) mapped segments by reordering content segments into a new set of streams having target quality levels, where one of the new output streams can include content segments from streams originally encoded at different maximum bitrates and/or resolutions. In some embodiments, the process #500 includes the transmitting (#514) of the quality based streaming information including (but not limited to) quality metadata, mapped segment data, and quality based streaming manifests. Once encoding has been completed with respect to all of the content, the process completes. Otherwise, more encoding occurs.

Although specific processes related to utilizing an aggressiveness factor to determine how aggressively a target quality is attempted to be achieved when performing quality based streaming are described above with reference to FIG. 5, any of a variety of processes for utilizing information about streaming conditions during playback to select content segments to achieve a supported target quality level can be utilized as appropriate to the requirements of specific applications in accordance with various embodiments of the invention. Understanding the specifics of how quality information is generated, including quality information that can be utilized in quality based streaming systems is discussed below.

Generating Quality Information for Content Segments

In typical adaptive streaming applications, only certain factors, such as bitrate and segment length are taken into account when determining which segments of content to stream. However, this method does not take into account the quality of a particular content segment in performing a stream switching decision. By analyzing the quality of individual content segments, a quality based streaming system may provide instances where the perceptual quality could improve or at least be stable, as well as utilize content in a way that allows for brief periods of content being transmitted that are above the maximum bandwidth allowed in typical situations. Individual pieces of content, including (but not limited to) frames of video may be analyzed either individually or in groups to determine their perceptual quality. In a number of embodiments, the quality of a content segment can be determined based upon the quality of a single IDR frame or multiple frames within the content segment. Where quality is determined based upon measuring the quality of multiple frames, the quality can be determined in any of a variety of ways including (but not limited to) the average quality, a weighted average in which lower quality frames are given greater weight than higher quality frames, selecting the quality of the lowest quality frame and/or any of a variety of techniques as appropriate to the requirements of a given application. In certain embodiments, the duration of content segments can vary within a stream and the quality measurement of the content segment is modified based upon the duration of the content segment. Analyzing the quality of content allows for the subsequent mapping of segments of content based on a comparison of the segments against a target quality level.

Figure 6:
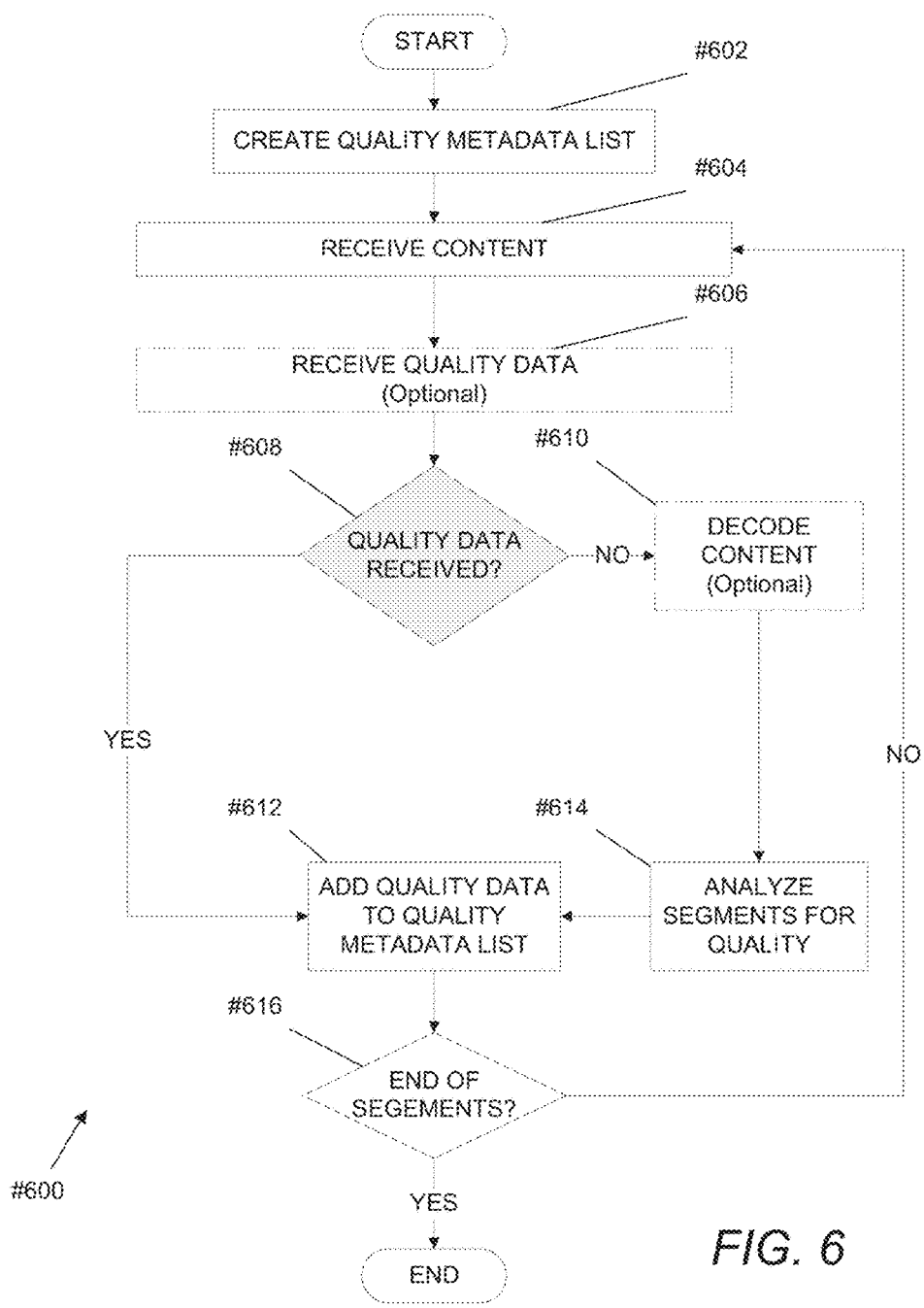
FIG. 6 is a flow chart illustrating a process for a quality information generator in accordance with an embodiment of the invention.

A process for generating quality metadata for use in a quality based streaming system by analyzing the quality of content segments in accordance with an embodiment of an invention is shown in FIG. 6. In certain embodiments of the process #600, a quality metadata list file may be created (#602), which is a file that can be populated with quality metadata as the quality metadata is generated by the process. In some embodiments, the metadata list file may be a streaming manifest that is to be altered. In further embodiments, the quality and size metadata to be generated can be stored on formats including (but not limited to), a separate metadata track in the content, as an index file, and as data piggybacked onto previous responses. In many embodiments, the process #600 receives (#604) content and may also receive (#606) quality data. The process #600 typically determines (#608) if quality metadata was received. In a number of embodiments, the process #600 may decode (#610) the content. The process #600 may also analyze (#614) segments of the content for quality to create quality metadata. This analysis may include, (but is not limited to) Peak Signal to Noise Ratio (PSNR), Structural Similarity (SSIM), and Mean Opinion Score (MOS). As can readily be appreciated, one or more of a variety of different quality metrics can be utilized to process the encoded and/or decoded content segments to determine a quality score or scores for the purpose of creating quality metadata. In further embodiments, the process #600 adds (#612) quality metadata to a quality metadata list. This quality metadata can be transmitted to a number of devices including (but not limited to), content servers, clients, proxy clients on the same device, gateway devices, redirection servers, and cloud services. Once quality metadata has been generated with respect to all of the content segments, the process completes.

Although specific processes related to generating quality information for content segments are described above with reference to FIG. 6, any of a variety of processes can be utilized as appropriate to the requirements of specific applications in accordance with various embodiments of the invention. As noted above, quality information is utilized by content server systems in accordance with many embodiments of the invention to package content for streaming using a packaging application. In other embodiments, the quality metadata can be utilized by playback devices to perform stream switching decisions and redirection servers to provide playback devices with references to content that can be requested to achieve quality based streaming. A more detailed description of the use of quality information by packaging applications in accordance with certain embodiments of the invention follows.

Process for Mapping and Packaging Content for Quality Based Streaming

A packaging application can be utilized to map and package content for quality based streaming. In many embodiments, a packaging application can perform processes similar to the mapping and packaging operations described above with reference to FIG. 4. These operations organize content segments encoded to achieve a target maximum bitrate into streams that achieve a target quality level.

Figure 7:
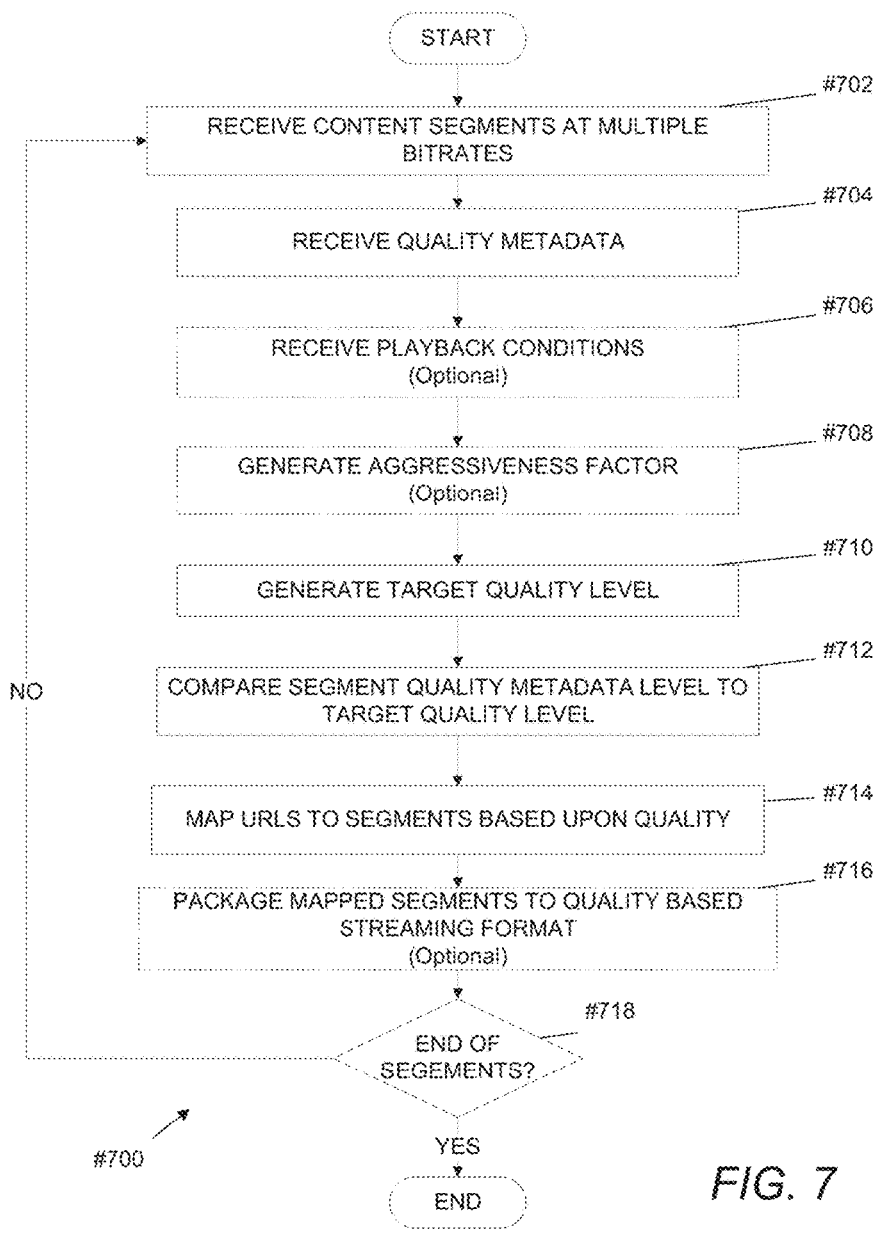
FIG. 7 is a flow chart illustrating a process for packaging content in accordance with an embodiment of the invention.

A process for mapping and packaging content in a packaging application for use in quality based streaming systems in accordance with an embodiment of an invention is shown in FIG. 7. The process #700 typically receives (#702) content segments in the form of multiple streams encoded at different maximum bitrates and/or resolutions. The quality of each of the streams may vary based upon the characteristics of the content and corresponding segments encoding the same content can also be of different quality. In numerous embodiments, the process #700 receives (#704) quality information in the form of quality metadata generated using a process similar to the processes described above. In certain embodiments, the process #700 receives (#706) playback condition information and generates (#708) an aggressiveness factor based, in part, on the available playback condition information using a process similar to the processes described above. A target quality level or a set of target quality levels can be generated (#710). In some embodiments, the target quality level is an average of a group of previous segments. In further embodiments, the target quality level is determined in part, from an aggressiveness factor. The quality metadata for corresponding content segments can be compared (#712) against one or more target quality levels and are mapped (#714) to specific content streams based upon the comparison. In several embodiments, the number of quality streams obtained is fewer than the original set of encoded streams. In other embodiments, there may be an equal number of quality streams obtained compared to the original set of encoded streams. In many embodiments, the quality streams may differ from the original streams by containing segments encoded at different maximum bitrates or resolutions. In some embodiments, the process #700 can package (#716) mapped segments into a format suitable for quality based streaming. This packaging may also include (but is not limited to) generating quality based streaming manifests, or mapped segment URLs. Once quality metadata has been generated and all necessary segments packaged with respect to all of the content segments, the process completes. Formats suitable for quality based streaming can include conventional file formats used to contain content streams in adaptive bitrate streaming systems and/or file formats that encode information including (but not limited to): metadata describing the different resolutions and/or encoding parameters utilized to encoded content segments within a content stream; and metadata describing quality of individual content segments within the content stream. As can readily be appreciated, any media file format appropriate to the requirements of a given application can be utilized in quality based streaming systems in accordance with various embodiments of the invention.

Although specific processes related to mapping and packaging content in quality based streaming systems are described above with reference to FIG. 7, any of a variety of processes can be utilized for organizing content segments into streams based upon target quality levels for use in quality based streaming in accordance with various embodiments of the invention. An example of a mapping of content segments encoded at different maximum bitrates to streams organized based upon target quality levels is discussed further below by way of illustration of the mapping processes that can be utilized during quality based streaming and/or the packaging of content for quality based streaming in accordance with various embodiments of the invention.

Mapping Content Segments Based on Target Quality

In typical adaptive bitstream systems, a number of alternative bitstreams are encoded based upon the same source content. The alternative bitstreams are typically encoded to create a set of alternative bitstreams including bitstreams encoded at different resolutions and/or maximum bitrates. As discussed above, a set of alternative bitstreams can be used as an input to a mapping process to create a set of streams having different target quality levels. The alternative bitstreams that are used as input to the mapping process can be divided into segments that are analyzed for quality using processes similar to the processes described above with reference to FIG. 6. A set of streams having different target quality levels is generated by comparing the quality of each of the corresponding segments from the alternative bitstreams, and the target quality level. In certain embodiments, a target quality that is supported at a given network data rate may result in the selection of bitstream segment encoded at maximum bitrate lower than other segments that have maximum bitrates that are less than the network data rate. In many instances, the mapping process may involve selection of segments from a higher quality bitstream encoded with a maximum bitrate that exceeds the available network data rate. These higher quality selections may be achieved, in part, due to assumptions concerning the amount of content buffered at the time the content is requested.

The mapping of content segments based on target quality is conceptually illustrated in FIG. 8. Four input streams at different bitrates are shown on the left grid (A, being the bitstream encoded at the highest maximum bitrate, and D being the bitstream encoded at the lowest maximum bitrate). As discussed above, video encoded using the same encoding profile will have varying quality depending upon the type of content encoded by a particular video segment. In the illustrated embodiment, the video segments in each of the four input streams are assigned quality scores (represented by a number 1-7 for each of the segments numbered 1-6). These quality scores are provided to a quality mapper, which generates a set of output streams based upon a set of target qualities (instead of target maximum bitrates). The target quality of each output stream is represented as a number in a shaded box corresponding to each bitrate. The quality of each segment of content is compared to a target quality. The segment selected from the input streams for inclusion in an output stream with a specific target quality is determined based upon the segment with the lowest bitrate that achieves the target quality. In certain embodiments, segments of content encoded at a maximum bitrate that is higher than the available bandwidth may be included within an output stream by the mapper. In several embodiments, the ability of the mapper to include segments of content encoded at a maximum bitrate that is higher than the available bandwidth may depend upon an aggressiveness factor determined based upon current streaming conditions.

While a specific process for mapping content segments based on target quality is illustrated in FIG. 8, other mapping processes can be implemented on various computing devices as appropriate to the requirements of specific applications in accordance with various embodiments of the invention. While many embodiments may use mapping to generate output streams and quality based streaming manifests that can be used by playback devices to perform quality based streaming, quality based streaming can also be implemented on a playback device through stream switching decisions that consider quality metadata. Playback devices that can implement quality based streaming in accordance with various embodiments of the invention are described below.

Utilizing Playback Devices to Provide Quality Based Streaming

Many of the embodiments described above utilize server systems to determine content segments to stream under different playback conditions to achieve quality based streaming. Such system rely upon a playback device that simply requests content indicated in a quality based manifest or in URLs provided by a redirection server based upon the measured playback conditions. In a number of embodiments, however, the playback device receives quality metadata describing available content segments from a remote server and utilizes the quality metadata to locally determine the content segments to request given present playback conditions to achieve a target quality that is capable of being supported under the present playback conditions. These segment switching decisions may be determined not only be requesting segments that achieve a certain bitrate, but can also be formatted to request a certain target quality level, which may then shift the stream switching decision to another device including (but not limited to) content servers, redirection servers, home gateways, and edge servers.

Figure 9:
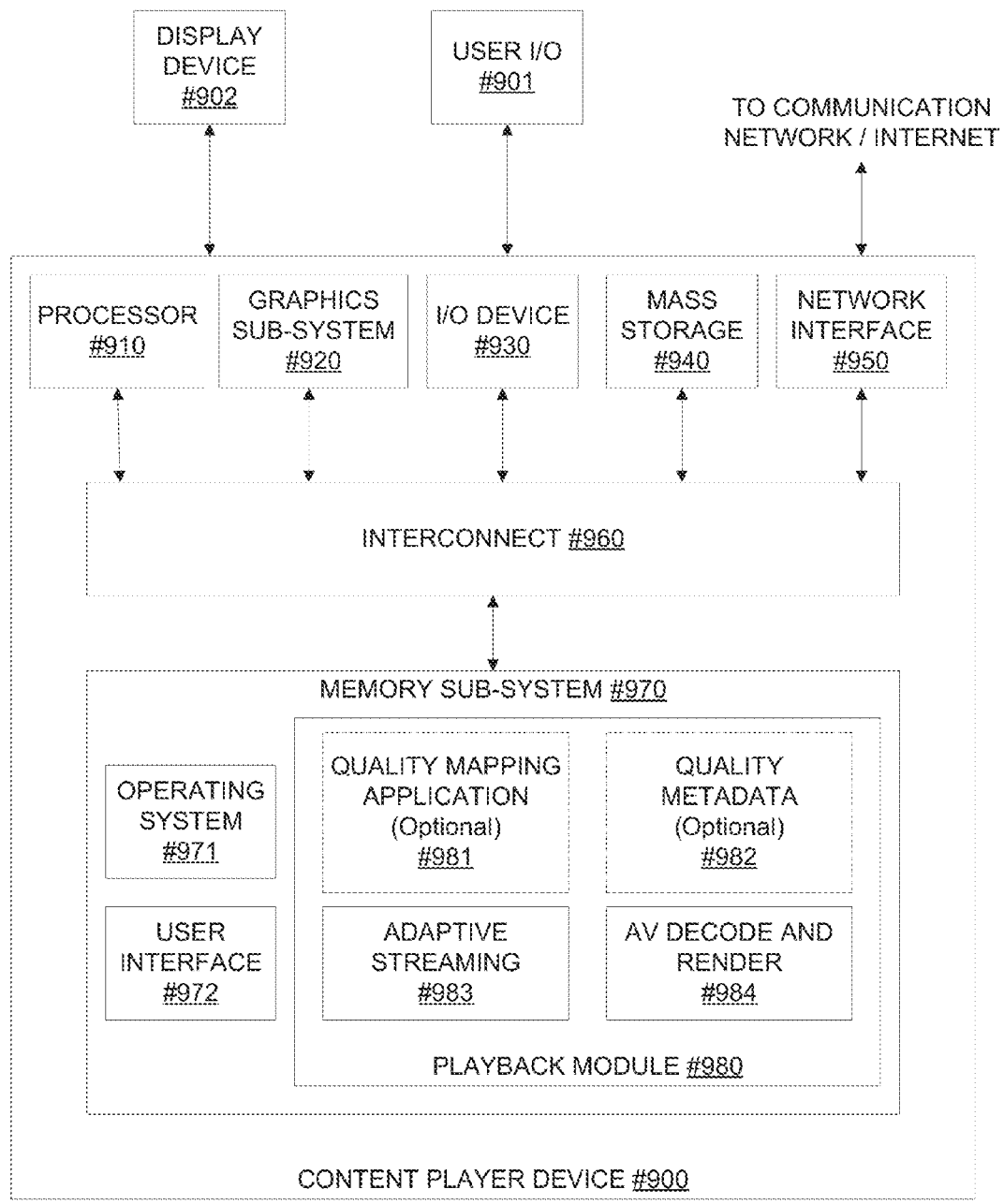
FIG. 9 conceptually illustrates a playback device in accordance with an embodiment of the invention.

A playback device that can be utilized to perform quality based streaming of content in accordance with an embodiment of the invention is illustrated in FIG. 9. Playback device #900 typically includes a processor #910, graphics sub-system #920, I/O device #930, mass storage #940, network interface #950, interconnect #960, and memory sub-system #970. The memory subsystem may contain an operating system #971, user interface #972, and playback module #980. Many embodiments of the invention include a playback device #900 which has a playback module #980 that further includes an adaptive streaming application #983, a decoding and rendering application #984, a quality mapping application #981, and quality metadata #982. Certain embodiments of the invention may have a playback device #900 that receives content via an interface with a communication network including, (but not limited to), the Internet. Additionally, further embodiments of the invention can include a display device #902 connected to the playback device #900. Still further embodiments of the invention can include user I/O #901 interfacing with a playback device #900.

While a variety of playback device systems are described above with reference to FIG. 9, other playback devices incorporating any of a variety of hardware enabling downloading and playback of content segments in accordance with any of a number of different processes for selecting the content segments can be utilized as appropriate to the requirements of specific applications in accordance with various embodiments of the invention. For example, in certain embodiments, a home gateway or other edge network device may select the segments needed for multiple client devices at once based on each client's capabilities, characteristics, and requirements. Processes that can be utilized by playback devices to provide quality based streaming of content in accordance with a number of embodiments of the invention are explored below.

Process for Quality Based Content Playback

Playback devices in conventional adaptive streaming systems can monitor streaming conditions and can make stream switching decisions based upon the maximum bitrates at which the streams are encoded. By utilizing stream switching decisions that consider streaming conditions and the quality of the specific content segment that is being requested, a playback device can implement quality based streaming.

Figure 10:
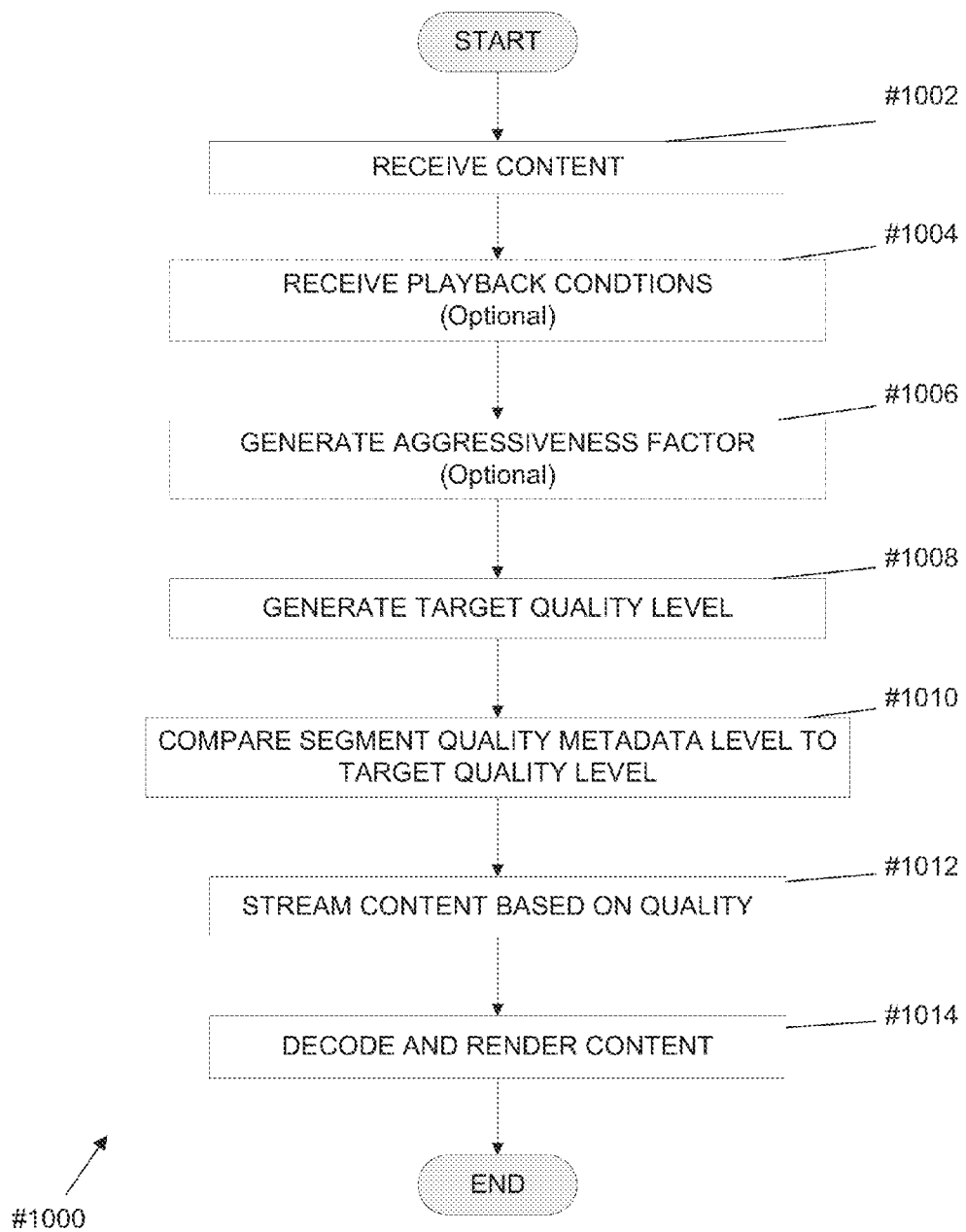
FIG. 10 is a flow chart illustrating a process for performing constant quality streaming on a playback device in accordance with an embodiment of the invention.

A process for performing stream switching decisions on a playback device to achieve quality based streaming in accordance with an embodiment of an invention is shown in FIG. 10. The process #1000 involves receiving (#1002) content segments. In certain embodiments the process #1000 also receives (#1004) playback condition information including (but not limited to), playback location, previous number of stream switches, and buffer levels. If it is determined (#1006) that no quality metadata was received, an aggressiveness factor can be generated (#1008). A target quality level is selected (#1010) and the quality metadata for content segments compared (#1012) against the target quality level. The process #1000 requests (#1018) content segments based on quality and can decode (#1020) and render the streamed content. In a number of embodiments, the request can be to specific content segments. In certain embodiments, the request can be for a duration of content (e.g. 10 seconds) at a specified target quality level.

Although specific processes for performing quality based streaming by considering quality metadata when performing stream switching is described above with reference to FIG. 10, any of a variety of processes utilized playback devices for performing quality based streaming of content can be utilized as appropriate to the requirements of specific applications in accordance with various embodiments of the invention.

Redirection Server Architecture

Various embodiments of quality based streaming systems described above involve the encoding of content into quality based streams, the use of quality based streaming manifests to select encoded content in a manner the results in quality based streaming, and/or consideration of quality metadata when making stream switching decisions to achieve quality based streaming. Systems and methods in accordance with several embodiments of the invention can also utilize the services of a redirection server to select content segments to stream based upon the quality of the content segments and the current streaming conditions. In certain embodiments, a redirection server utilizes information received from a playback device to select content segments to recommend streaming. The playback device can ignore the recommendation, or use the recommendation to request a content segment. In a number of embodiments, the redirection server is a stateful server that records the playback state of the playback device for the purpose of making redirection recommendations. The redirection server can maintain the state of the playback device just based upon the current time and the history of content segments requested by the playback device. A content segment requested by a playback device using a conventional adaptive bitrates streaming manifest and/or stream switching process carries with it implied information concerning the minimum amount of network bandwidth available. The redirection server can use this information to infer the current streaming conditions in combination with the history that it maintains, which can be used to infer the playback duration of the content segments buffered by the playback device. The playback device may also provide information concerning the current streaming conditions directly to the redirection server concerning playback conditions and the redirection server can provide a reference to a content segment based upon this information. In certain embodiments, the redirection server can be implemented in a stateless manner when the playback device provides information concerning the current streaming conditions and (optionally) a reference to a content segment to the redirection server.

Figure 11:
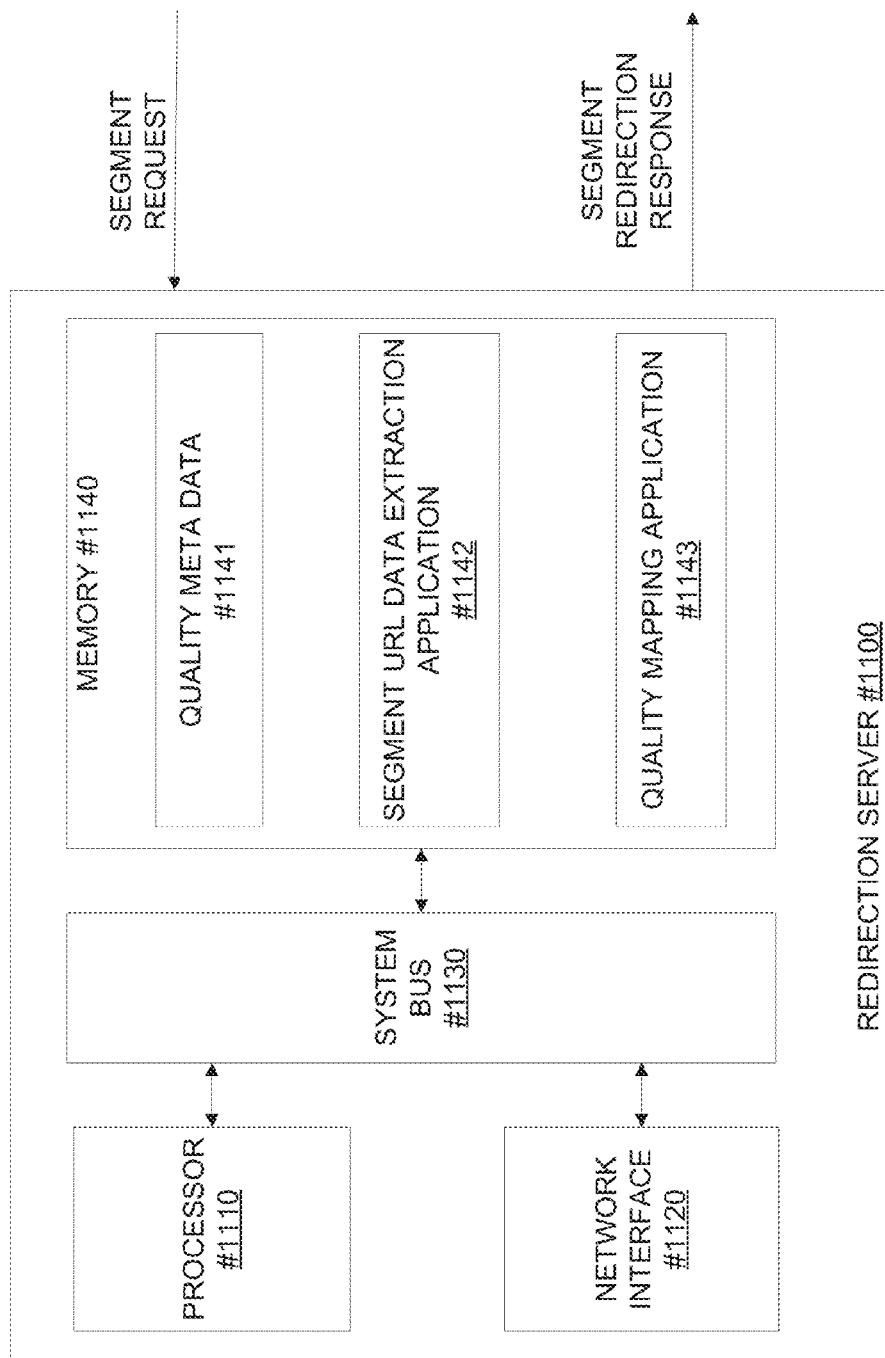
FIG. 11 conceptually illustrates a redirection server in accordance with an embodiment of the invention.

A redirection server that can be utilized to identify content segments that a playback device can utilize to achieve quality based streaming in accordance with an embodiment of the invention is illustrated in FIG. 11. In many embodiments of the invention, the redirection server #1100 is configured to receive requests for segments of content and/or information about the current streaming conditions and redirect the request to a content streaming that will achieve a target quality in accordance with the invention. In certain embodiments, the redirection server #1100 receives a quality based streaming manifest for segment redirection. In other embodiments, the redirection server #1100 generates the redirection response based upon quality metadata maintained at the redirection server. The redirection response can contain one or more URLs that can be utilized by a playback device to request content segments and/or the redirection server can act as a proxy server and request content segments that are then forwarded as the redirection responses where the resolution of the redirection response differs from the originally requested content segment, the redirection response can contain metadata describing the resolution of the content segment.

Redirection server #1100 typically includes a processor #1110, network interface #1120, system bus #1130, and memory #1140. A redirection server memory #1140 may contain quality metadata #1141, a segment URL data extraction application #1142, and quality mapping application #1143.

While a variety of redirection server systems are described above with reference to FIG. 11, other server configurations can be implemented as appropriate to the requirements of specific applications in accordance with various embodiments of the invention. For example, in certain embodiments of the invention, the redirection server #1100 may be a separate server in a different facility than a content server. In other embodiments of the invention, the redirection server may be a virtual machine. Processes that can be performed by redirection servers to identify content segments that can be utilized by playback devices to perform quality based streaming in accordance with various embodiments of the invention are discussed further below.

Process for Redirecting Segment Requests

Figure 12:
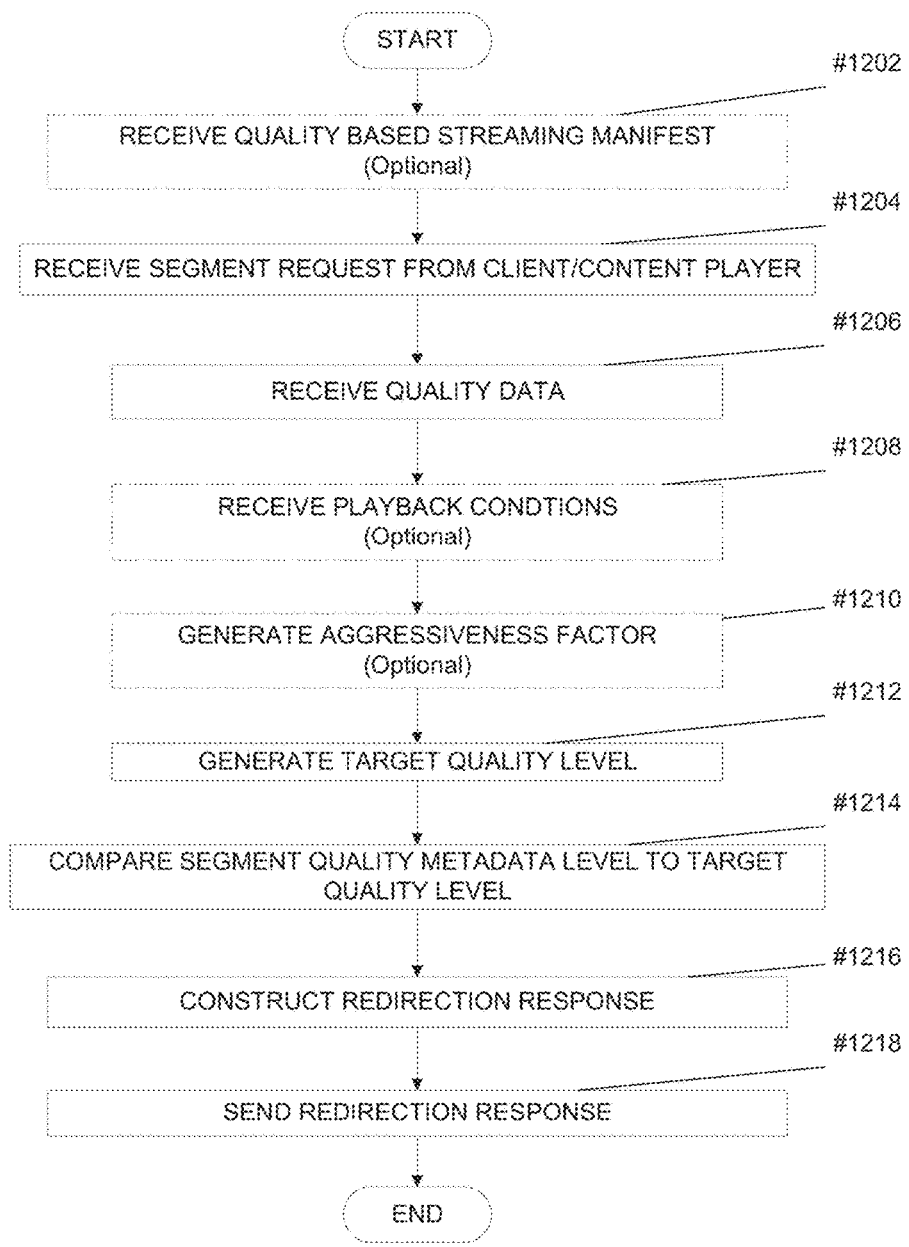
FIG. 12 is a flow chart illustrating a process for constant quality streaming on a redirection server in accordance with an embodiment of the invention.

A process for redirecting segment requests in quality based streaming systems in accordance with an embodiment of an invention is shown in FIG. 12. In several embodiments of the invention, content segment requests may be sent to a redirection server which redirects the request based on quality to a different content segment in accordance with the invention. In certain embodiments of the invention, a redirection server may retrieve a response from a quality based streaming manifest. In other embodiments of the invention, a redirection server may retrieve a redirection response from mapped segments. In many embodiments, the redirection server can log content requests for future analysis to determine, for example, the network bandwidth of content players. In addition, the logs can be used to identify content segments that can be re-encoded at lower maximum bitrates that can be utilized to achieve quality target levels at specific network bandwidths and/or develop new encoding profiles for general use. In some embodiments of the invention, the redirection response may include, (but is not limited to), a URL, or byte range.

The process #1200 may receive (#1202) a quality based streaming manifest. In many embodiments, the process #1200 typically receives (#1204) at least one segment request from a client or playback device. When a quality based streaming manifest is received, a target quality level can be generated (#1214) and used to generate a redirection response. When a quality based streaming manifest is not available, the process #1200 receives (#1206) quality metadata for any of a variety of sources including those described above. In certain embodiments the process #1200 receives (#1208) playback condition information including (but not limited to), playback location, previous number of stream switches, and buffer levels. In further embodiments, the process #1200 can generate (#1210) an aggressiveness factor. In many embodiments, the process #1200 generates (#1212) a target quality level, compares (#1214) the quality metadata for segments against a target quality level, and constructs (#1216) a redirection response. In many embodiments, the process #1200 sends (#1218) a redirection response in the form of a content segment in place of the original content segment request. In a number of embodiments, the redirection response identifies a content segment that the playback device then requests.

Although specific processes for generating redirection responses are described above with reference to FIG. 12, any of a variety of processes for redirecting segment requests in quality based streaming systems can be utilized as appropriate to the requirements of specific applications in accordance with various embodiments of the invention. Communications between a redirection server and a playback device when performing quality based streaming using redirection requests in accordance with various embodiments of the invention are discussed further below.

Timing of Redirection Request

Figure 13:
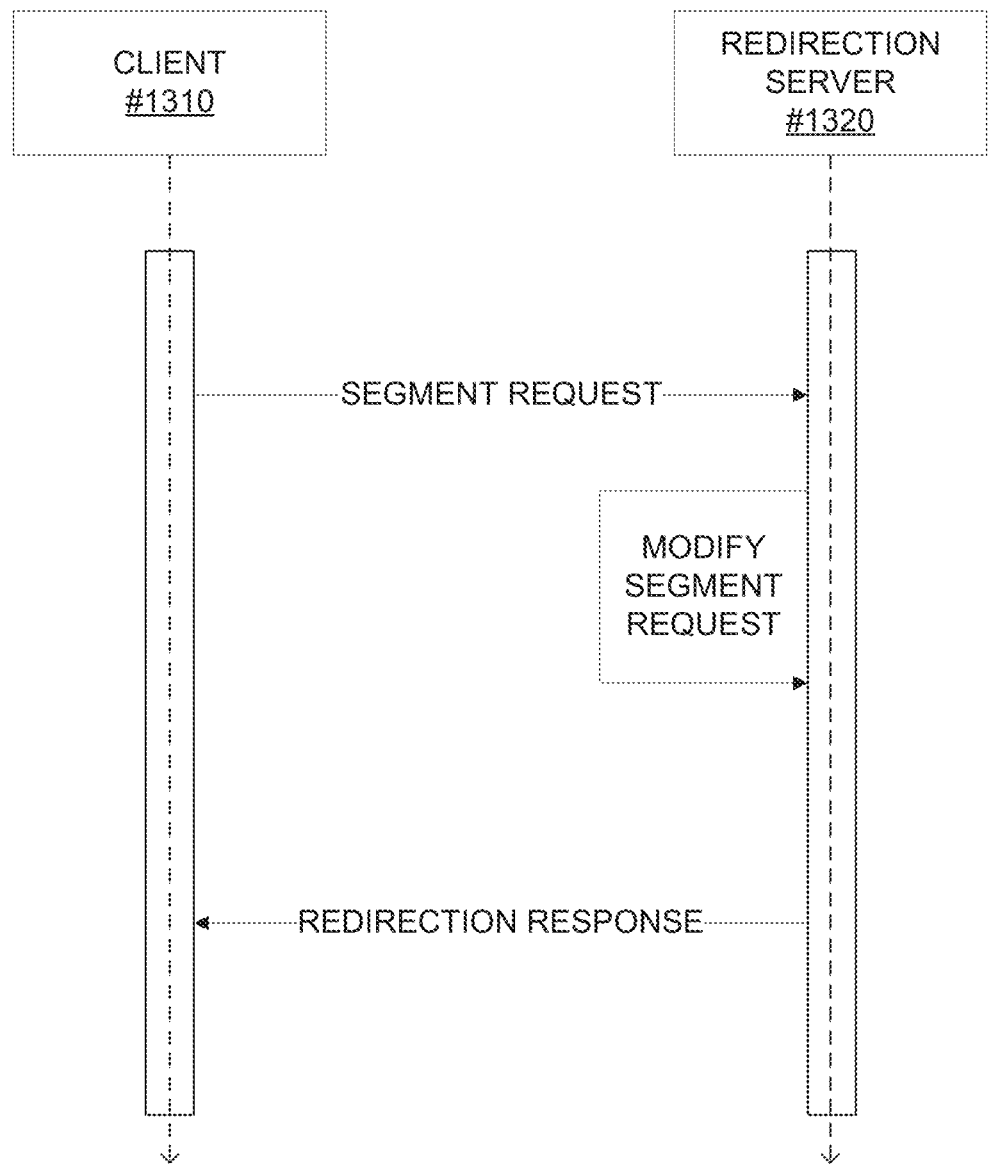
FIG. 13 conceptually illustrates communication between a client and a redirection server associated with redirection of content segment requests in accordance with an embodiment of the invention.

Communication between a playback device or client and a redirection server in accordance with an embodiment of the invention is illustrated in FIG. 13. In many embodiments of the invention, a request for a segment of content will be sent to a redirection server. A redirection server may retrieve a proper segment request in accordance with certain embodiments of the invention.

In the illustrated embodiment, a client #1310 sends a request for a segment of content to a redirection server #1320. The redirection server #1320 retrieves a segment request in accordance with the quality based streaming system. The redirection server #1320 sends back a redirection response to the client #1310.

While a variety of client and redirection server systems are described above with reference to FIG. 13, other configurations can be implemented as appropriate to the requirements of specific applications in accordance with various embodiments of the invention. For example, in certain embodiments of the invention, the redirection server #1100 may be a separate server in a different facility than a content server. In other embodiments of the invention, the redirection server may be a virtual machine.

Utilizing Downstairs (Time-Window) Bitrates for Quality Based Streaming

A typical method for determining the bitrate required for uninterrupted streaming of content is to ascertain the maximum bitrate of the entire length of the content. However, the performance of a quality based streaming system in accordance with many embodiments of the invention can be significantly enhanced by examining the maximum bitrate required to download content segments during a certain playback window of time. For example, a certain period of the content may contain many of the largest sized segments toward the beginning. After overcoming this above average section, the maximum bitrate required to stream the remaining portions of the content may be lower than the maximum bitrate over the entire content. In some embodiments of the invention, the remaining portion of a file may be examined to determine a lower bitrate that can achieve quality based streaming. Alternatively, in certain embodiments, a window of time of the content is examined which may yield a much lower download rate than the overall average bitrate. Such circumstances can provide information about the likelihood of a large upcoming shift in the required bitrate. This allows the content player to know whether it can sustain streaming the specific profile given potential upcoming bitrate variations, current bandwidth, and available buffer levels. Moreover, in further embodiments of the invention, a comparison between the average bitrate and time-window bitrate may occur which may tell the quality based streaming system to maintain at least a minimum of the average bitrate and perhaps increase to a higher time-window rate if it is higher than the overall average. It can be appreciated that these time windows may be any length of time including (but not limited to), shorter time periods for live content, longer periods of time for video on demand or other pre-recorded content, and time-windows that extend to the end of the content to be streamed. The time-window rate may depend on the amount of content buffered as such buffered content may affect the remaining amount of the time-window that remains to be downloaded. Furthermore, in a number of embodiments, a safety margin may be employed to prevent an interruption in service. This safety margin may include (but is not limited to) requiring some amount of content to be buffered. In most embodiments of the invention, this time-window information is utilized to provide better stream switching decisions. For example, when the time-window rate is below the average bitrate, a decision may be made to follow the time-window rate to maximize quality or to follow the average bitrate. Such time window information may be provided for use in devices including (but not limited to) content players, redirection servers, and/or gateways. These devices may receive the window-rate data in methods including (but not limited to), adding the information to manifest files, analyzing byte ranges of segment URLs, and making HTTP HEAD requests to the segments under analysis.

Figure 14:
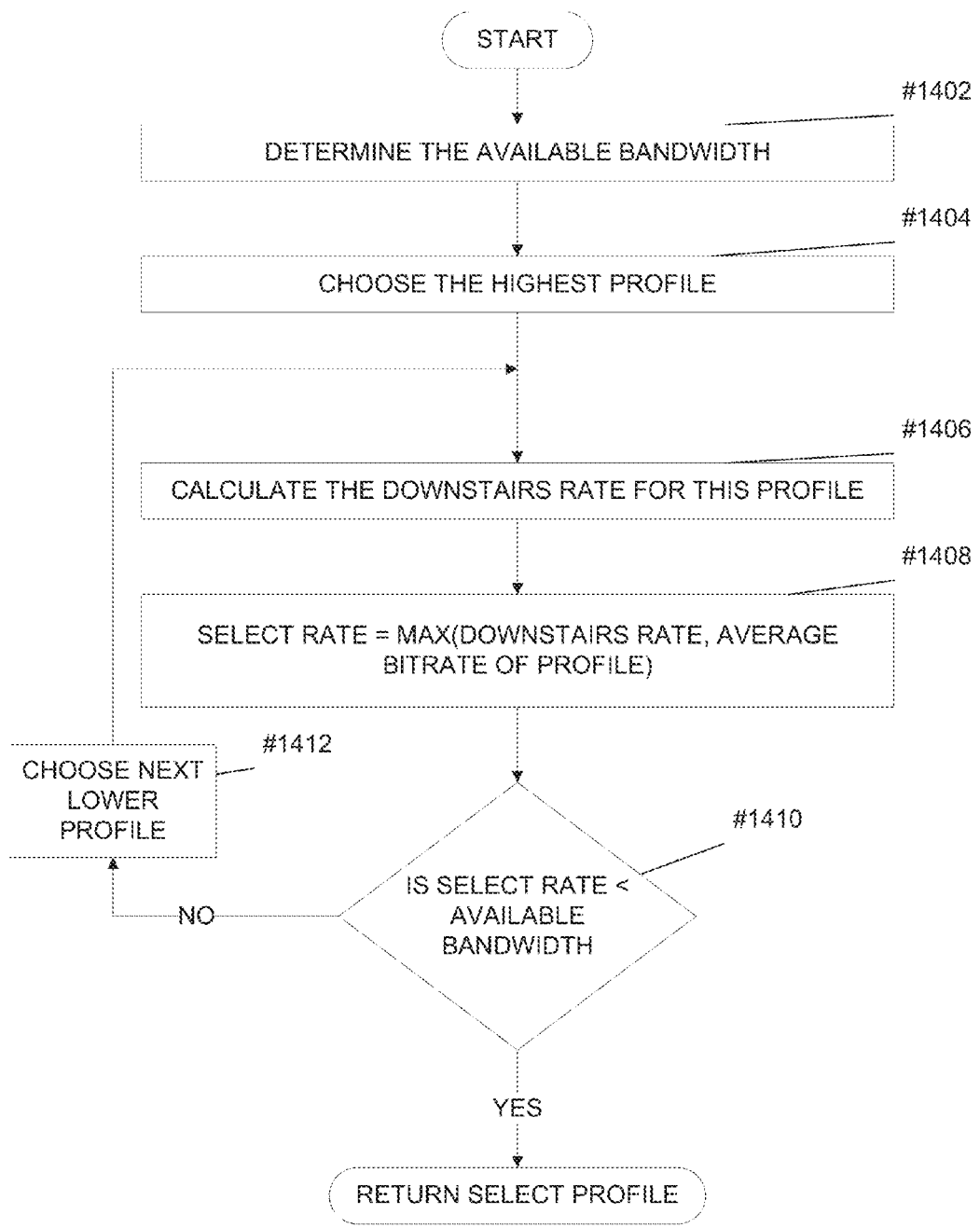
FIG. 14 is a flow chart illustrating a process for selecting content segments to request based upon the bandwidth requirements of remaining content segments in accordance with an embodiment of the invention.

A process for using time windows in quality based streaming systems in accordance with an embodiment of an invention is shown in FIG. 14. In several embodiments of the invention, content segments from a particular stream may be selected based on the available bandwidth and downstairs rate determined using time windows using processes similar to those described herein.

The process #1400 may determine (#1402) the available bandwidth of the current connection. In many embodiments the process #1400 also chooses (#1404) the highest quality stream supported at an available bandwidth. In certain embodiments of the invention, the process #1400 may calculate (#1406) the downstairs rate for the stream. In addition, the process #1400 includes selecting (#1408) a rate that is equal to either the most maximum value of either the downstairs rate or the average bitrate of a profile. Many embodiments of the process #1400 typically determine (#1410) if a selected rate is less than the available bandwidth. The process described in FIG. 14 can be better understood with reference to FIGS. 15-18.

Figure 15:
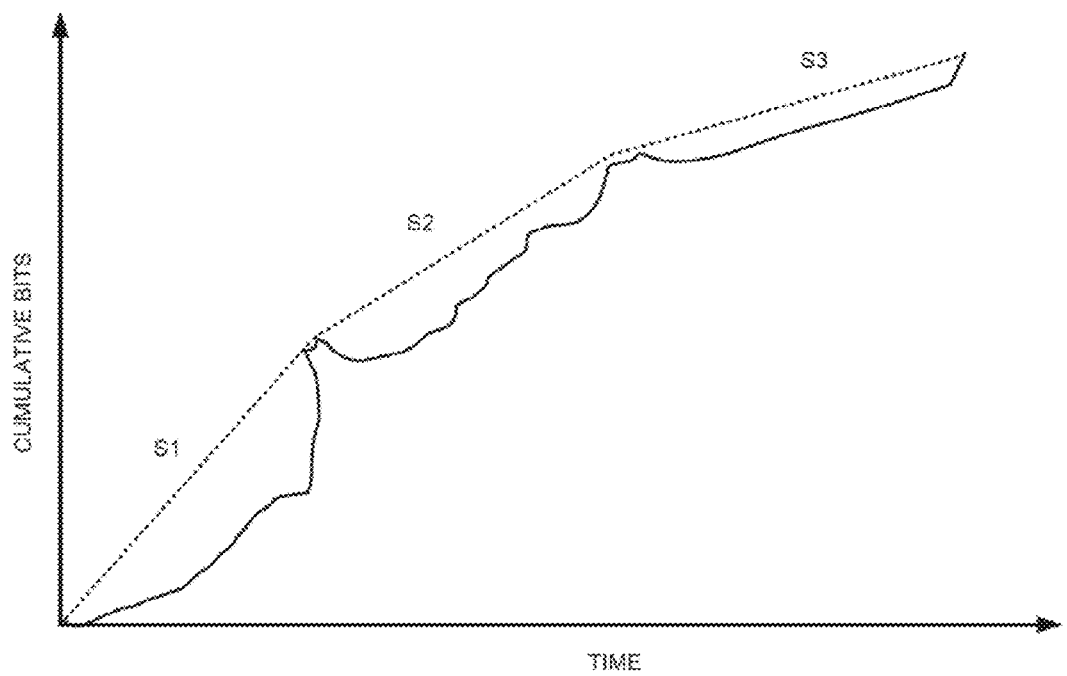
FIG. 15 is an illustration of a curve representing cumulative bits of an encoded VBR video sequence in accordance with an embodiment of the invention.

FIG. 15 illustrates a graphical representation/curve of cumulative bits of an encoded VBR video sequence. For determining a rate required to stream a particular section of video, tangents are drawn for the curve such that the tangents at any point do not cross the cumulative bitrate curve. As seen from FIG. 15, the sequence is divided into 3 sections s1, s2, s3 by the tangential lines. Slope of each tangential line, i.e, cumulative bits/duration determines the rate required to stream the particular section of the video.

Figure 16:
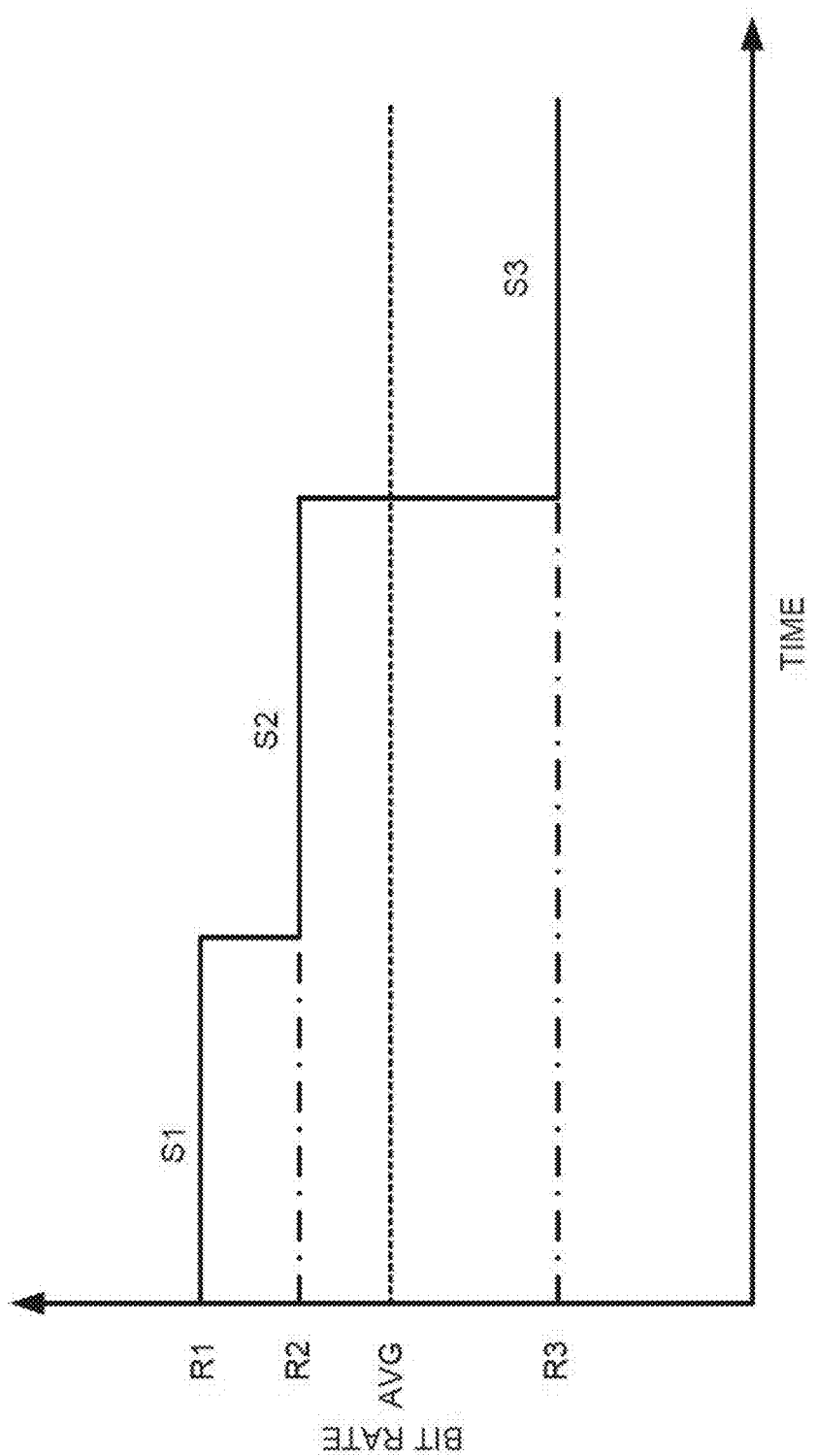
FIG. 16 is an illustration of rates calculated for each section of FIG. 14. in accordance with an embodiment of the invention.

FIG. 16 illustrates a graphical representation of rates calculated for each section s1, s2, s3 of FIG. 15. The calculated rates, for example, are represented as bitrate r1, r2 and r3. An example average bitrate (Avg) of the entire content is also shown. In one example, the rates r1 and r2 may be above the average bitrate and r3 can be below the average bitrate. However, in different embodiments, different sections may have bitrates above or below the average bitrate.

Figure 17:
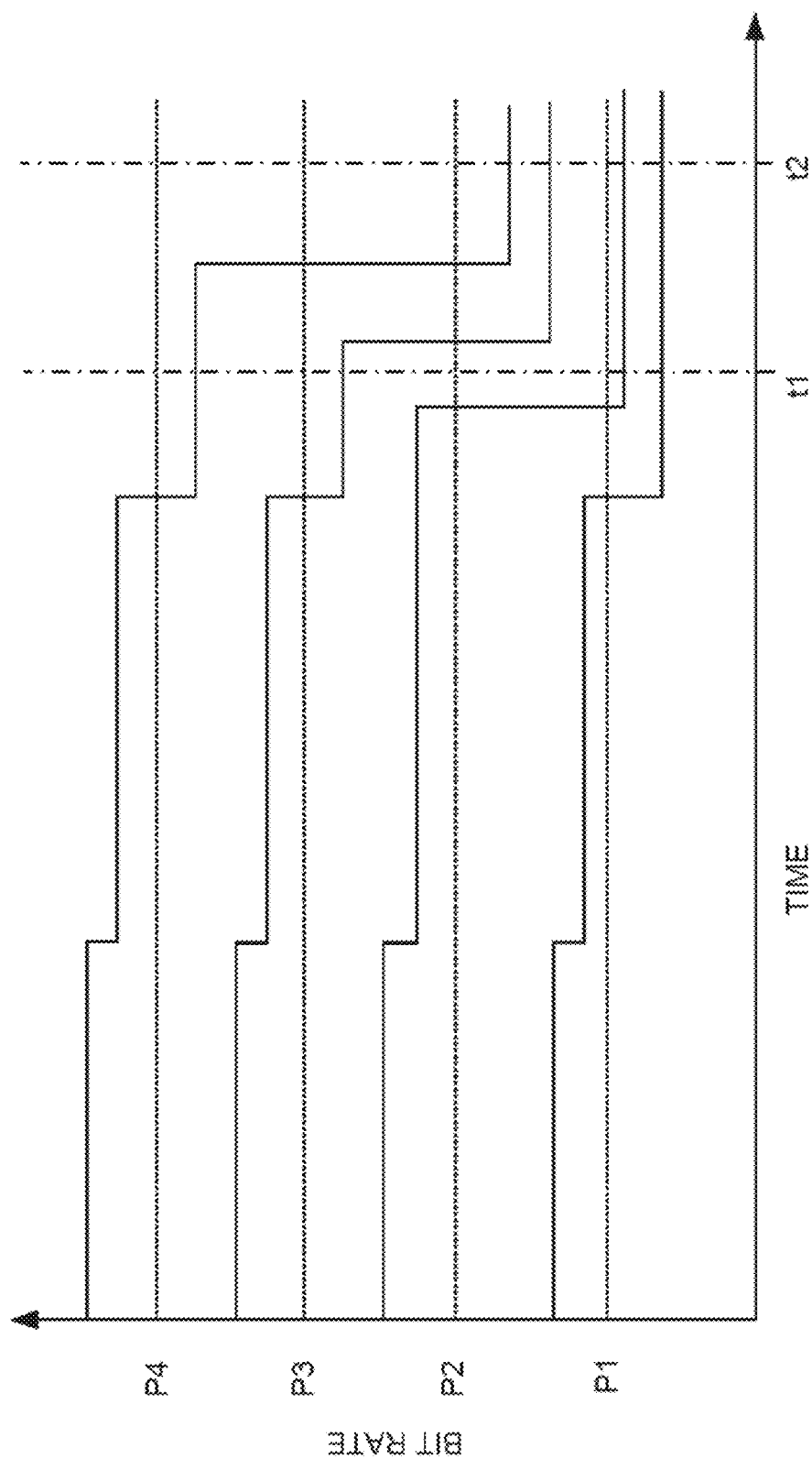
FIG. 17 is an illustration of the downstairs scheme for content encoded at multiple average bitrates in accordance with an embodiment of the invention.

FIG. 17 illustrates a graphical representation of the downstairs scheme for the video content encoded at multiple average bitrates P1, P2, P3 and P4 (profiles). This depicts an adaptive streaming multi-bitrate scenario where the media player selects a profile based on available bandwidth. Consider an example, where the content player receives a bandwidth equal to the average bitrate of P2. In such a case, the content player selects profile P1 until time t1 as shown in FIG. 17. Beyond time t1, the bitrate needed to stream profile P2 is lesser than the available bandwidth, therefore P2 is selected. Similarly at time t2 the content player, in one example, may select profile P4. When the downstairs scheme is used for adaptive bitrate streaming, the content player may select higher quality profiles as the playback progresses. The system, according to the present subject matter, may, in one example, avoid a situation where the player keeps choosing higher quality profiles even though the bandwidth at the player has not changed. For this purpose, the average bitrate of the profile and the current downstairs bitrate are compared to determine the higher bitrate among these two bitrates. Based on the comparison, the bit rate higher among these two rate are selected for adaptation decisions. Therefore, avoiding stepping up in quality and thus saving bits transferred.

Figure 18:
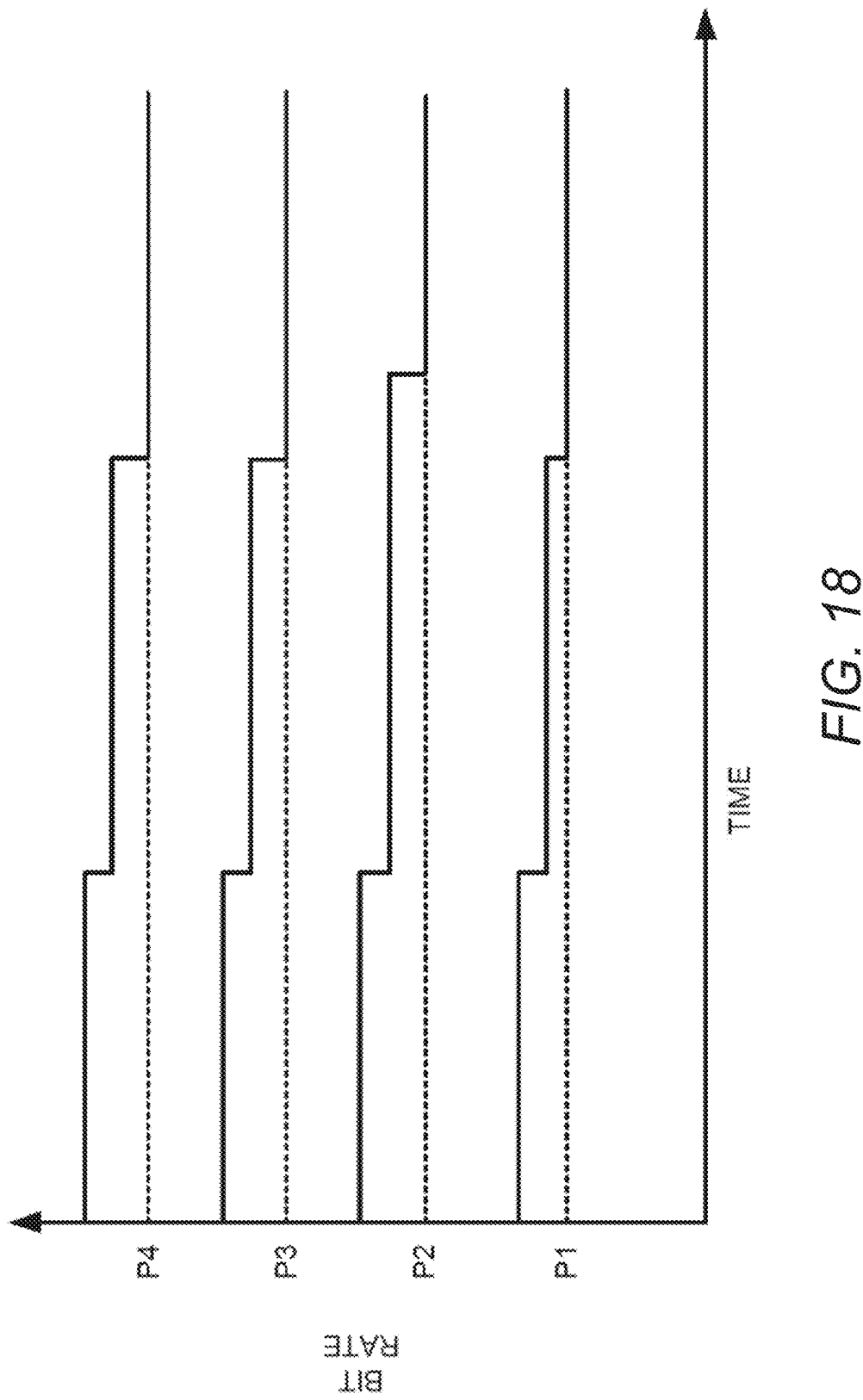
FIG. 18 is an illustration of the bitrate returned by the system/method in accordance with an embodiment of the invention.

FIG. 18 illustrates a graphical representation of the bitrate returned by the system/method in accordance with the present subject matter. As illustrated in FIG. 18, the calculated bitrate is lower capped by the average bitrate of the profile. This may avoid the content player from switching to higher profiles with time when the available bandwidth remains constant.

Although specific processes for utilizing time-window bitrates are described above with reference to FIGS. 14-18, any of a variety of processes for utilizing time-window bitrates in quality based streaming systems can be utilized as appropriate to the requirements of specific applications in accordance with various embodiments of the invention.

Although the present invention has been described in certain specific aspects, many additional modifications and variations would be apparent to those skilled in the art. It is therefore to be understood that the present invention may be practiced otherwise than specifically described, including various changes in the implementation, without departing from the scope and spirit of the present invention. Thus, embodiments of the present invention should be considered in all respects as illustrative and not restrictive.

What is claimed is:

1. A quality based streaming content player system comprising:
   a processor;
   a network interface; and
   a memory connected to the processor, where the memory contains a content player application;
   wherein the content player application directs the processor to:
      receive quality metadata describing a plurality of streams, where:
         the plurality of streams are encoded at different maximum bitrates;
         each stream is divided into content segments; and
         quality varies between content segments in each stream, wherein the quality depends on a type of content encoded by a content segment;
      generate an aggressiveness factor based on playback condition data;
      measure available bandwidth via the network interface; and
      request content segments from the plurality of streams based upon the available bandwidth and the quality metadata describing the plurality of streams, where the requested content segments include content segments encoded at a maximum bitrate and having quality that is a lowest maximum bitrate that achieves a target quality level, and the requested content segments are selected based upon the aggressiveness factor, the available bandwidth, the quality metadata describing the selected content segments, and a calculated bitrate, wherein the calculated bitrate is a higher of an average bitrate of a given stream and a time-window rate, the time-window rate being a minimum bitrate for downloading a window of content from the given stream without playback interruption given content segments currently buffered by a content player.

2. The quality based streaming content player system of claim 1, wherein the received quality metadata describing a plurality of streams is contained within at least one manifest file.

3. The quality based streaming content player system of claim 1, wherein requesting content segments from the plurality of streams further comprises selecting content streams encoded at different maximum bitrates at a given available network bandwidth based upon quality of the content segments.

4. The quality based streaming content player system of claim 1, wherein:
   the plurality of streams are encoded at different resolutions; and
   requesting content segments from the plurality of streams further comprises selecting content streams having different resolutions at a given available network bandwidth based upon quality of the content segments.

5. The quality based streaming content player system of claim 4, wherein the quality of the content segments at different resolutions are selected by using at least one measurement process selected from a group consisting of: comparing number of encoded bits per pixel, measuring mean squared error between a low resolution frame of video scaled to meet a higher resolution frame of video, and analyzing contrast value of one or more frames in a video.

6. The quality based streaming content player system of claim 1, where the window of content is selected from a group consisting of: a predetermined duration of content, and remaining content segments in a stream.

7. The quality based streaming content player system of claim 1, wherein the quality metadata describes segment sizes of content segments.

8. The quality based streaming content player system of claim 1, wherein: the quality metadata is contained within a manifest file identifying byte ranges of each of the content segments; and the content player application further directs the processor to determine sizes of the content segments from the byte ranges of each of the content segments in the manifest file.

9. The quality based streaming content player system of claim 1, wherein the plurality of streams described by the quality metadata are generated from source content by multiple encoders that each encode one of the plurality of streams.

10. The quality based streaming content player system of claim 9, wherein:
   the quality metadata is contained within a manifest file containing URLs identifying content segments; and
   the content player application further directs the processor to determine sizes of the content segments by requesting header information using URLs from the manifest file.

11. The quality based streaming content player system of claim 9, wherein the source content is received and encoded in real time using single-pass encoding.

12. The quality based streaming content player system of claim 1, wherein the target quality level is generated based on quality levels of previously requested content segments.

13. The quality based streaming content player system of claim 1, wherein the target quality level is determined based upon a moving average of a set of content segments encoded at the same maximum bitrate.

14. The quality based streaming content player system of claim 13, wherein the moving average is a weighted average with content segments described as having lower quality levels by the quality metadata having a higher weight compared to content segments described as having higher quality levels by the quality metadata.

15. The quality based streaming content player system of claim 1, wherein the target quality level is a range of specific quality values.

16. The quality based streaming content player system of claim 1, wherein requesting content segments from the plurality of streams also includes selecting content segments encoded at a higher maximum bitrate than the available network bandwidth.

17. The quality based streaming content player system of claim 1, wherein the playback condition data comprises at least one piece of data selected from a group consisting of: playback duration, bandwidth variation, current buffer level and current bandwidth.

18. A method for quality based streaming comprising:
receiving content including a plurality of streams at a content server system, where:
the plurality of streams are encoded at different maximum bitrates;
each stream is divided into content segments; and
quality varies between content segments in each stream, wherein the quality depends on a type of content encoded by a content segment;
measuring quality of the content segments using the content server system;
generating quality metadata describing the content segments based upon content segment quality measurements using the content server system; and
transmitting the quality metadata to a playback device using the content server system, where the playback device:
measures playback conditions;
generates an aggressiveness factor based on the playback conditions;
selects content segments based upon an available bandwidth, the aggressiveness factor, quality metadata describing the content segments, and a calculated bitrate, wherein the calculated bitrate is a higher of an average bitrate-of a given stream and a time-window rate, the time-window rate being a minimum bitrate for downloading a window of content from the given stream without playback interruption given content segments currently buffered by a content player; and
requests the selected content segments.

19. A quality based redirection server system comprising:
a processor;
at least one network interface; and
a memory connected to the processor, where the memory contains a redirection application;
wherein the redirection application directs the processor to:
receive quality metadata describing a plurality of streams, where:
the plurality of streams are encoded at different maximum bitrates;
each stream is divided into content segments; and
quality varies between content segments in each stream, wherein the quality depends on a type of content encoded by a content segment;
receive a plurality of segment requests via the network interface;
generate segment redirection responses from the plurality of streams based upon an available bandwidth and the quality metadata describing the plurality of streams, where the segment redirection responses include content segments encoded at a maximum bitrate and having quality that is a lowest maximum bitrate that achieves a target quality, and the content segments are selected based upon an aggressiveness factor determined based on playback conditions, an available bandwidth, the quality metadata describing the selected content segments, and a calculated bitrate, wherein the calculated bitrate is a higher of an average bitrate of a given stream and a time-window rate, the time-window rate being a minimum bitrate for downloading a window of content from the given stream without playback interruption given content segments currently buffered by a content player; and
transmit the segment redirection responses via the network interface.

* * * * *